(12) United States Patent
Honma et al.

(10) Patent No.: US 6,864,006 B2
(45) Date of Patent: *Mar. 8, 2005

(54) PROTON-CONDUCTING MEMBRANE, METHOD FOR PRODUCING THE SAME, AND FUEL CELL USING THE SAME

(75) Inventors: Itaru Honma, AIST Tsukuba Central 2, National Institute of Advanced Industrial Science and Technology, 1-1, Umezono, 1-chome, Tsukuba-shi, Ibaraki-ken, 305-8568 (JP); Shigeki Nomura, Tsukuba (JP); Toshiya Sugimoto, Tsukuba (JP); Osamu Nishikawa, Tsukuba (JP)

(73) Assignees: National Institute of Advanced Industrial Science and Technology, Tokyo (JP); Itaru Honma, Tsukuba (JP); Sekisui Chemical Co., Ltd., Osaka (JP)

( * ) Notice: Subject to any disclaimer, the term of this patent is extended or adjusted under 35 U.S.C. 154(b) by 268 days.

This patent is subject to a terminal disclaimer.

(21) Appl. No.: 10/038,875

(22) Filed: Jan. 8, 2002

(65) Prior Publication Data

US 2003/0003340 A1 Jan. 2, 2003

(30) Foreign Application Priority Data

| Jan. 9, 2001 | (JP) | ............................................ 2001-1862 |
| Sep. 5, 2001 | (JP) | ........................................ 2001-269067 |
| Jan. 4, 2002 | (JP) | ................................................ 2002-10 |

(51) Int. Cl.$^7$ .............................................. H01M 8/10
(52) U.S. Cl. .......................... 429/33; 429/306; 429/313; 429/317
(58) Field of Search ........................... 429/33, 306, 313, 429/317

(56) References Cited

U.S. PATENT DOCUMENTS 5,682,261 A * 10/1997 Takada et al. ............... 359/321
6,465,136 B1 * 10/2002 Fenton et al. ................ 429/309
6,468,684 B1 * 10/2002 Chisholm et al. ............. 429/33
6,638,659 B1 * 10/2003 Fenton et al. .................. 429/40
6,680,138 B1 * 1/2004 Honma et al. ................. 429/33

FOREIGN PATENT DOCUMENTS

| JP | 08-249923 | 9/1996 |
| JP | 09-087510 | 3/1997 |
| JP | 09-110982 | 4/1997 |
| JP | 10-021943 | 1/1998 |
| JP | 10-045913 | 2/1998 |
| JP | 10-069817 | 3/1998 |

OTHER PUBLICATIONS

US 20020091225 published on Jul. 11, 2002 with its priority of the provisional application 60/234,177 filed on Sep. 20, 2000.*

US 20030099874 publish on May 29, 2003.*

* cited by examiner

Primary Examiner—Hoa Van Le
(74) Attorney, Agent, or Firm—Armstrong, Kratz, Quintos, Hanson, & Brooks, LLP

(57) ABSTRACT

A proton-conducting membrane, excellent in resistance to heat, durability, dimensional stability and fuel barrier characteristics, and showing excellent proton conductivity at high temperature and a method for producing the same. A proton-conducting membrane includes a carbon-containing compound and inorganic acid, characterized by a phase-separated structure containing a carbon-containing phase containing at least 80% by volume of the carbon-containing compound and inorganic phase containing at least 80% by volume of the inorganic acid, the inorganic phase forming the continuous ion-conducting paths. The method for producing the above proton-conducting membrane includes steps of preparing a mixture of a carbon-containing compound (D) having one or more hydrolyzable silyl groups and inorganic acid (C), forming the above mixture into a film, and hydrolyzing/condensing the hydrolyzable silyl group contained in the mixture formed into the film, to form a three-dimensionally crosslinked silicon-oxygen structure (A). The above proton-conducting membrane is incorporated in a fuel cell.

23 Claims, 4 Drawing Sheets

STEM-BF image

STEM-HAADF image

JEM-2010F/STEM

PROTON-CONDUCTING MEMBRANE, METHOD FOR PRODUCING THE SAME, AND FUEL CELL USING THE SAME

TECHNICAL FIELD

This invention relates to a proton (hydrogen ion)-conducting membrane, method for producing the same, and fuel cell using the same, more particularly the proton-conducting membrane, excellent in resistance to heat, durability, dimensional stability and fuel barrier characteristics, and showing excellent proton conductivity at high temperature, method for producing the same, and fuel cell using the same, and, at the same time, the proton-conducting membrane for the direct fuel type fuel cell which is directly supplied with fuel, e.g., methanol or methane, method for producing the same, and fuel cell using the same.

BACKGROUND OF THE INVENTION

Recently, fuel cell has been attracting attention as a power generating device of the next generation, which can contribute to solution of the problems related to environments and energy, now having been increasingly becoming serious social problems, because of its high power generation efficiency and compatibility with the environments.

Fuel cells fall into several categories by electrolyte type. Of these, a polymer electrolyte fuel cell (PEFC), being more compact and generating higher output than any other type, is considered to be a leading fuel cell type in the future for various purposes, e.g., small-size on-site facilities, and as movable (i.e., power source of vehicles) and portable applications.

Thus, PEFCs have inherent advantages in principle, and extensively developed for commercialization. PEFCs normally uses hydrogen as the fuel. Hydrogen is dissociated into proton (hydrogen ion) and electron in the presence of catalyst provided on the anode side. Of these, the electron is passed to the outside to produce power, and recycled back to the system on the cathode side. On the other hand, the proton is passed to the proton-conducting membrane, through which it moves towards the cathode side. On the cathode side, the proton, electron recycled back from the outside and oxygen supplied from the outside are bonded to each other in the presence of catalyst, to produce water. Thus, a PEFC by itself is a very clean energy source which generate power while it is producing water from hydrogen and oxygen.

Hydrogen to be supplied to a fuel cell is normally produced by an adequate method, e.g., methanol reforming to extract hydrogen. However, the direct fuel type fuel cell has been also extensively developed. It is directly supplied with methanol or the like, from which the proton and electron are produced in the presence of catalyst, where water is normally used together with methanol.

In the fuel cell, the proton-conducting membrane is responsible for transferring the proton produced on the anode to the cathode side. As described above, flow of the proton takes place in concert with that of the electron. It is therefore necessary to conduct a sufficient quantity of the proton at high speed, for a PEFC to produce high output (or high current density). Therefore, it is not too much to say that performance of the proton-conducting membrane is a key to performance of the PEFC. The proton-conducting membrane also works as the insulation film which electrically insulates the anode and cathode from each other and as the fuel barrier membrane which prevents the fuel to be supplied to the anode side from leaking to the cathode side, in addition to transferring the proton.

The proton-conducting membranes for the current PEFCs are mainly of fluorine resin-based ones, with a perfluoro-alkylene as the main skeleton, and partly with sulfonic acid group at the terminal of the perfluorovinyl ether side chains. Several types of these fluorine resin-based membranes have been proposed, e.g., Nafion R membrane (Du Pont, U.S. Pat. No. 4,330,654), Dow membrane (Dow Chemical, Japanese Patent Application Laid-Open No.4-366137), Aciplex R membrane (Asahi Chemical Industries, Japanese Patent Application Laid-Open No.6-342665), and Flemion R membrane (Asahi Glass).

The fluorine resin-based membrane is considered to have a glass transition temperature (Tg) of around 130° C. under a wet condition. The so-called creep phenomenon occurs as temperature increases from the above level to cause problems, e.g., changed proton-conducting structure in the membrane to prevent the membrane from stably exhibiting the proton-conducting performance, and modification of the membrane to a swollen morphology, or jelly-like morphology to make it very fragile and possibly cause failure of the fuel cell. Moreover, the sulfonic acid group tends to be eliminated when the membrane of wet morphology is exposed to high temperature, to greatly deteriorate its proton-conducting performance. For these reasons, the maximum allowable temperature for stable operation for extended periods is normally considered to be 80° C.

A fuel cell, depending on the chemical reaction for its working principle, has a higher energy efficiency as it operates at higher temperature. In other words, a fuel cell operating at higher temperature becomes more compact and lighter for the same output. Moreover, a fuel cell operating at high temperature allows to utilize its waste heat for cogeneration to produce power and heat, thus drastically enhancing its total energy efficiency. It is therefore considered that operating temperature of a fuel cell is desirably increased to a certain level, normally to 100° C. or higher, in particular 120° C. or higher.

The catalyst in service on the anode side may be deactivated by impurities in the hydrogen fuel (e.g., carbon monoxide), a phenomenon known as catalyst poisoning, when it is not sufficiently purified. This is a serious problem which can determine serviceability of the PEFC itself. It is known that the catalyst poisoning can be avoided when the fuel cell operates at sufficiently high temperature, and the cell is preferably operated at high temperature also from this point of view. Moreover, the active metals for the catalyst itself will not be limited to pure noble metals, e.g., platinum, but can be extended to alloys of various metals, when the fuel cell can operate at sufficiently high temperature. Therefore, operability at high temperature is advantageous also viewed from reducing cost and widening applicable resources.

For the direct fuel type fuel cell, various approaches to extract the proton and electron from the fuel directly and efficiently have been studied. It is a consensus that production of sufficient power is difficult at low temperature, and possible when temperature is increased to, e.g., 150° C. or higher.

Thus, operability of PEFCs at high temperature is demanded from various aspects. Nevertheless, however, its operating temperature is limited to 80° C. at present by the heat resistance consideration of the proton-conducting membrane, as discussed above.

The reaction taking place in a fuel cell is exothermic in nature, by which is meant that temperature within the cell spontaneously increases as the cell starts to work. However, the PEFC must be cooled not to be exposed to high temperature of 80° C. or higher, as limited by the resistance of the proton-conducting membrane to heat. It is normally cooled by water-cooling system, and the PEFC separator is devised to include such a system. This tends to increase size and weight of the PEFC as a whole, preventing it to fully exhibit its inherent characteristics of compactness and lightness. In particular, a water-cooling system as the simplest cooling means is difficult to effectively cool the cell, whose maximum allowable operating temperature is set at 80° C. If it is operable at 100° C. or higher, it should be effectively cooled by use of heat of vaporization of water, and water could be recycled for cooling to drastically reduce its requirement, leading to reduced size and weight of the cell. When a PEFC is used as the energy source for a vehicle, the radiator size and cooling water volume could be greatly reduced when the cell is controlled at 100° C. or higher than controlled at 80° C. Therefore, the PEFC operable at 100° C. or higher, i.e., the proton-conducting membrane having a heat resistance of 100° C. or higher, is strongly in demand.

As described above, the PEFC operable at higher temperature, i.e., increased heat resistance of the proton-conducting membrane, is strongly in demand viewed from various aspects, e.g., power generation efficiency, cogeneration efficiency, cost, resources and cooling efficiency. Nevertheless, however, the proton-conducting membrane having a sufficient proton conductivity and resistance to heat has not been developed so far.

With these circumstances as the background, a variety of heat-resistant proton-conducting membrane materials have been studied and proposed to increase operating temperature of PEFCs.

Some of more representative ones are heat-resistant aromatic-based polymers to replace the conventional fluorine-based membranes. These include polybenzimidazole (Japanese Patent Application Laid-Open No.9-110982), polyether sulfone (Japanese Patent Application Laid-Open Nos.10-21943 and 10-45913), and polyetheretherketone (Japanese Patent Application Laid-Open No.9-87510).

These aromatic-based polymers have an advantage of limited structural changes at high temperature. However, many of them have the aromatic structure directly incorporated with sulfonic acid or carboxylic acid group. They tend to suffer notable desulfonation or decarboxylation at high temperature, and unsuitable for the membranes working at high temperature.

Moreover, many of these aromatic-based polymers have no ion-channel structure, as is the case with fluorine resin-based membranes. As a result, the membranes of these polymers tend to be notably swollen as a whole in the presence of water, causing various problems, e.g., high possibility of separation of the membrane from the electrode joint and broken membrane due to the stress produced at the joint in the membrane-electrode assembly, resulting from the dry and wet conditional cycles which change the membrane size, and possibility of deteriorated strength of the water-swollen membrane, leading to its failure. In addition, each of the aromatic polymers is very rigid in a dry condition, possibly causing damages and other problems while the membrane-electrode assembly is formed.

On the other hand, the following inorganic materials have been proposed as the proton-conducting materials. For example, Minami et al. incorporate a variety of acids in hydrolyzable silyl compounds to prepare inorganic proton-conducting materials (Solid State Ionics, 74 (1994), pp.105). They stably show proton conductivity at high temperature, but involve several problems; e.g., they tend to be cracked when made into a thin film, and difficult to handle and make them into a membrane-electrode assembly.

Several methods have been proposed to overcome these problems. For example, the proton-conducting material is crushed to be mixed with an elastomer (Japanese Patent Application Laid-Open No.8-249923) or with a polymer containing sulfonic acid group (Japanese Patent Application Laid-Open No.10-69817). However, these methods have their own problems. For example, the polymer as the binder for each of these methods is merely mixed with an inorganic crosslinked compound, and has basic thermal properties not much different from those of the polymer itself, with the result that it undergoes structural changes in a high temperature range, failing to stably exhibit proton conductivity, and its proton conductivity is generally not high.

A number of R & D efforts have been made for various electrolyte membranes to solve these problems involved in the conventional PEFCs. None of them, however, have succeeded in developing proton-conducting membranes showing sufficient durability at high temperature (e.g., 100° C. or higher) and satisfying the mechanical and other properties.

In the direct methanol type fuel cell (sometimes referred to as DMFC) which works on methanol as the fuel in place of hydrogen, on the other hand, methanol directly comes into contact with the membrane. The sulfonated fluorine resin-based membrane, e.g., Nafion membrane, now being used has a strong affinity for methanol, possibly causing problems which can lead to failure of the fuel cell when it absorbs methanol, e.g., swelling to a great extent and dissolution in methanol in some cases. Crossover of methanol to the oxygen electrode side can greatly reduce cell output. These problems are common also with the electrolyte membranes containing an aromatic ring. Therefore, the membranes developed so far are neither efficient nor durable also for DMFCs.

It is an object of the present invention to provide a proton-conducting membrane, excellent in resistance to heat, durability, dimensional stability and fuel barrier characteristics, and showing excellent proton conductivity at high temperature, which can solve the problems involved in the conventional PEFCs. It is another object of the present invention to provide a method for producing the same. It is still another object of the present invention to provide a fuel cell using the same.

BRIEF DESCRIPTION OF THE DRAWINGS

FIG. 1 schematically shows the sea-island phase-separated structure constituting the proton-conducting membrane of the present invention.

FIG. 2 schematically shows the phase-separated structure in which both phases are continuous, also constituting the proton-conducting membrane of the present invention.

FIG. 3 presents the microgram of the membrane prepared in EXAMPLE 1, taken by a field emission type electron microscope.

FIG. 4 presents the microgram of the membrane prepared in EXAMPLE 13, taken by a field emission type electron microscope.

FIG. 5 presents the microgram of the membrane prepared in COMPARATIVE EXAMPLE 1, taken by a field emission type electron microscope.

DESCRIPTION OF THE REFERENCE NUMERALS AND SIGNS

Figure 1:
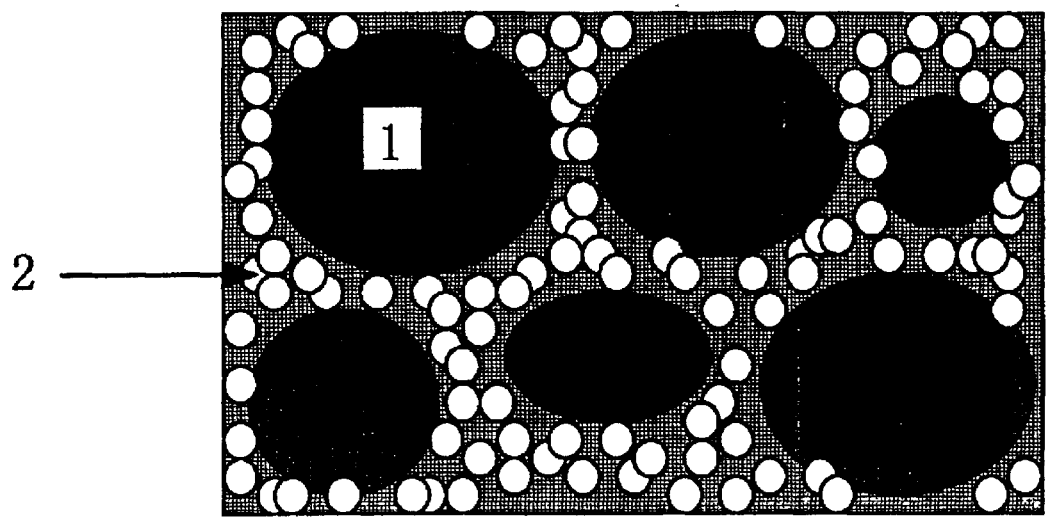
[FIG. 1]

1. Carbon-containing phase
2. Inorganic phase

DISCLOSURE OF THE INVENTION

The inventors of the present invention have found, after having extensively studied a variety of electrolyte membranes to solve the above problems, that an innovative organic/inorganic composite membrane can be obtained by including, as the essential components, a selected combination of specific organic material, three-dimensionally crosslinked structure containing a specific silicon-oxygen bond bound to the above organic material, and inorganic acid for imparting proton conductivity, reaching the present invention. It is structurally characterized by the continuous paths of the inorganic acid, which realize the composite unprecedentedly excellent in resistance to heat, durability, dimensional stability and fuel barrier characteristics, and showing excellent proton conductivity at high temperature.

The first aspect is a proton-conducting membrane, comprising a carbon-containing compound and inorganic acid, characterized by
  a phase-separated structure containing a carbon-containing phase containing at least 80% by volume of a carbon-containing compound and inorganic phase containing at least 80% by volume of an inorganic acid, the inorganic phase forming the continuous ion-conducting paths.

The second aspect is the proton-conducting membrane of the first invention, wherein the phase-separated structure is a sea-island structure with the carbon-containing phase as the island and inorganic phase as the sea.

The third aspect is the proton-conducting membrane of the first invention, wherein the phase-separated structure is composed of the carbon-containing phase and inorganic acid phase both in the form of continuous structure.

The fourth aspect is the proton-conducting membrane of one of the first to third inventions, comprising a three-dimensionally crosslinked silicon-oxygen structure (A), carbon-containing compound (B) bound to (A) via a covalent bond, and inorganic acid (C).

The fifth aspect is the proton-conducting membrane of the fourth invention, wherein the carbon-containing compound (B) is characterized by the skeleton section substituted with hydrogen at the joint with the three-dimensionally crosslinked silicon-oxygen structure (A), satisfying the following relationship:

$$(\delta p^2 + \delta h^2)^{1/2} \leq 7 (MPa)^{1/2}$$

wherein, δp and δh are the polarity and hydrogen bond components of the three-component solubility parameter.

The sixth aspect is the proton-conducting membrane of the fifth invention, wherein the carbon-containing compound (B) is bound to the three-dimensionally crosslinked silicon-oxygen structure (A) via 2 or more bonds.

The seventh aspect is the proton-conducting membrane of the sixth invention, wherein the skeleton section of the carbon-containing compound (B) is a hydrocarbon consisting of carbon and hydrogen.

The eighth aspect is the proton-conducting membrane of the seventh invention, wherein the skeleton section of the carbon-containing compound (B) has the structure represented by the following formula (1):

  (1)

wherein, "n" is an integer of 2 to 20.

The ninth aspect is the proton-conducting membrane of the seventh invention, wherein the skeleton section of the carbon-containing compound (B) has the structure represented by the following formula (2):

  (2)

wherein, "n" is a natural number of 4 or less.

The tenth aspect is the proton-conducting membrane of the sixth invention, wherein the skeleton section of the carbon-containing compound (B) has the structure represented by the following formula (3):

  (3)

wherein, $R^1$ and $R^2$ are each a group selected from the group consisting of $CH_3$, $C_2H_5$ and $C_6H_5$; and "l" is an integer of 2 to 20.

The 11$^{th}$ aspect is the proton-conducting membrane of the fourth invention, wherein the inorganic acid (C) is a heteropoly acid.

The 12$^{th}$ aspect is the proton-conducting membrane of the 11$^{th}$ invention, wherein the heteropoly acid is used in the form of being supported beforehand by fine particles of a metallic oxide.

The 13$^{th}$ aspect is the proton-conducting membrane of the 11$^{th}$ or 12$^{th}$ invention, wherein the heteropoly acid is a compound selected from the group consisting of tungstophosphoric, molybdophosphoric and tungstosilicic acid.

The 14$^{th}$ aspect is the proton-conducting membrane of the fourth invention, which contains 10 to 300 parts by weight of the inorganic acid (C) per 100 parts by weight of the three-dimensionally crosslinked silicon-oxygen structure (A) and carbon-containing compound (B) totaled.

The 15$^{th}$ aspect is a method for producing the proton-conducting membrane of one of the first to 14$^{th}$ inventions, comprising steps of preparing a mixture of a carbon-containing compound (D) and having one or more hydrolyzable silyl groups and the inorganic acid (C), forming the above mixture into a film, and hydrolyzing/condensing the hydrolyzable silyl group contained in the mixture formed into the film, to form the three-dimensionally crosslinked silicon-oxygen structure (A).

The 16$^{th}$ aspect is the method of the 15$^{th}$ invention for producing the proton-conducting membrane, wherein the skeleton section of the carbon-containing compound having one or more hydrolyzable silyl groups (D) whose hydrolyzable silyl group(s) are substituted by hydrogen satisfies the following relationship:

$$(\delta p^2 + \delta h^2)^{1/2} \leq 7 (MPa)^{1/2}$$

wherein, δp and δh are the polarity and hydrogen bond components of the three-component solubility parameter.

The 17$^{th}$ aspect is the method of the 16$^{th}$ invention for producing the proton-conducting membrane, wherein the carbon-containing compound (D) having one or more hydrolyzable silyl groups has 2 hydrolyzable groups.

The 18$^{th}$ aspect is the method of the 17$^{th}$ invention for producing the proton-conducting membrane, wherein the carbon-containing compound (D) having one or more hydrolyzable silyl groups is represented by the following formula (4):

$$(R^3)_{3-m}X_mSi—R^4—SiX_m(R^3)_{3-m} \qquad (4)$$

wherein, $R^3$ is a group selected from the group consisting of $CH_3$, $C_2H_5$ and $C_6H_5$; $R^4$ is a hydrocarbon compound consisting of carbon and hydrogen; X is a group selected from the group consisting of Cl, $OCH_3$, $OC_2H_5$ and $OC_6H_5$; and "m" is a natural number of 3 or less.

The 19$^{th}$ aspect is the method of the 18$^{th}$ invention for producing the proton-conducting membrane, wherein the carbon-containing compound (D) having one or more hydrolyzable silyl groups is represented by the following formula (5):

$$(R^3)_{3-m}X_mSi—(CH_2)_n—SiX_m(R^3)_{3-m} \qquad (5)$$

wherein, $R^3$ is a group selected from the group consisting of $CH_3$, $C_2H_5$ and $C_6H_5$; X is a group selected from the group consisting of Cl, $OCH_3$, $OC_2H_5$ and $OC_6H_5$; "m" is a natural number of 3 or less; and "n" is an integer of 2 to 20.

The 20$^{th}$ aspect is the method of the 18$^{th}$ invention for producing the proton-conducting membrane, wherein the compound (D) having one or more hydrolyzable silyl groups is represented by the following formula (6):

$$(R^3)_{3-m}X_mSi—CH_2CH_2—(C_6H_4)_n—CH_2CH_2—SiX_m(R^3)_{3-m} \qquad (6)$$

wherein, $R^3$ is a group selected from the group consisting of $CH_3$, $C_2H_5$ and $C_6H_5$; X is a group selected from the group consisting of Cl, $OCH_3$, $OC_2H_5$ and $OC_6H_5$; "m" is a natural number of 3 or less; and "n" is a natural number of 4 or less.

The 21$^{st}$ aspect is the method of the 17$^{th}$ invention for producing the proton-conducting membrane, wherein the compound (D) having one or more hydrolyzable silyl groups is represented by the following formula (7):

$$(R^3)_{3-m}X_mSi—O—(SiO)_l—SiX_m(R^3)_{3-m} \qquad (7)$$
$$\text{with } R^1 \text{ and } R^2 \text{ substituents on Si}$$

wherein, $R^1$, $R^2$ and $R^3$ are each a group selected from the group consisting of $CH_3$, $C_2H_5$ and $C_6H_5$; X is a group selected from the group consisting of Cl, $OCH_3$, $OC_2H_5$ and $OC_6H_5$; "m" is a natural number of 3 or less; and "l" is an integer of 2 to 20.

The 22$^{nd}$ aspect is the method of the 15$^{th}$ invention for producing the proton-conducting membrane, wherein the step of hydrolyzing/condensing the hydrolyzable silyl group to form the three-dimensionally crosslinked silicon-oxygen structure (A) uses water (E) to be contained in the mixture.

The 23$^{rd}$ aspect is the method of the 15$^{th}$ invention for producing the proton-conducting membrane, wherein the step of hydrolyzing/condensing the hydrolyzable silyl group to form the three-dimensionally crosslinked silicon-oxygen structure (A) is effected at 5 to 40° C. for 2 hours or more.

The 24$^{th}$ aspect is the method of the 15$^{th}$ invention for producing the proton-conducting membrane, wherein the step of hydrolyzing/condensing the hydrolyzable silyl group to form the three-dimensionally crosslinked silicon-oxygen structure (A) is followed by an aging step effected at 100 to 300° C.

The 25$^{th}$ aspect is the method of the 15$^{th}$ invention for producing the proton-conducting membrane, wherein the step of hydrolyzing/condensing the hydrolyzable silyl group to form the three-dimensionally crosslinked silicon-oxygen structure (A) is followed by a step in which a compound (F) having a hydrolyzable silyl group is spread and hydrolyzed/condensed, effected at least once.

The 26$^{th}$ aspect is a fuel cell which incorporates the proton-conducting membrane of one of the first to 14$^{th}$ invention.

PREFERRED EMBODIMENTS OF THE INVENTION

The present invention is described in detail.

1. Continuous Structure of the Inorganic Acid

The proton-conducting membrane of the present invention comprises a carbon-containing compound and inorganic acid, characterized by a carbon-containing phase containing at least 80% by volume of the carbon-containing compound and inorganic phase containing at least 80% by volume of the inorganic acid, the inorganic phase forming the continuous ion-conducting paths.

The proton-conducting membrane of the present invention has the component responsible for proton conduction (agent to impart proton conductivity) and the component responsible for securing the membrane properties, e.g., adequate softness. More specifically, the present invention uses an inorganic acid as the component responsible for proton conductance and carbon-containing compound as the component for securing the membrane properties.

The distributions of these components in the membrane are described.

First, when the proton moves in a system with the inorganic and carbon-containing phases uniformly dispersed or dissolved in each other, it must flow not only through the inorganic acid section, which easily conducts the proton, but also through the carbon-containing section, which conducts the proton less. When the proton should pass through the section providing more resistance to its flow, proton conductivity of the membrane decreases. It is necessary to incorporate a sufficient quantity of an inorganic acid to keep proton conductivity not decreased. A membrane will have an increased proton conductivity when it contains a sufficient quantity of an inorganic acid, which provides the paths through which the proton is continuously conducted (continuous inorganic acid section). However, such a membrane will be extremely fragile, or not self-sustaining. Moreover, the acid is dissolved in water in the fuel or formed by the reaction taking place in the fuel cell, which not only decreases proton conductivity drastically but also contaminates the entire device. In such a uniform dispersion system, therefore, there is a trade-off relationship between proton conductivity and membrane properties, and it is difficult to simultaneously satisfy them.

In order to simultaneously satisfy them, it is necessary to separately structure the inorganic acid section responsible for proton conductivity and carbon-containing compound section responsible for securing the membrane properties, in particular the inorganic acid section as the continuous phase which provides the paths for the proton conductance. When the section containing a larger quantity of inorganic acid forms the continuous phase, ion conductivity should increase, needless to say. It is therefore essential that the inorganic acid section forms the continuous phase.

The "continuous structure" means that the portions containing at least 80% by volume of an inorganic acid are continuously connected to each other in the electron microgram, e.g., that produced by the high-angle scattering dark field STEM method (Z-contrast microgram) taken by a field emission type electron microscope (e.g., JOEL's JEM-2010F). The observed results indicate that the inorganic acid section with a continuous structure gives a proton conductivity of $10^{-3}$ S/cm or more, and the section without such a structure gives a proton conductivity below $10^{-3}$ S/cm. The electron microscopic analysis provides the indirect evidence whether or not proton conductivity is $10^{-3}$S/cm or more.

The phase-separated structures with a continuous inorganic phase include layered structure, structure where both phases are continuous, and sea-island structure. Of these, the layered structure involves disadvantages of difficulty in controlling the structure due to necessity for orienting layers in the thickness direction, and anticipated decrease in bending strength.

The present invention adopts the sea-island structure or structure where both phases are continuous, to simultaneously achieve the intended high proton conductivity and membrane properties.

The sea-island structure of the present invention is described by referring to FIG. 1. It is essential for such a structure to have the carbon-containing phase as the island phase, and the inorganic phase with an inorganic acid as the major ingredient as the sea phase. When this relationship is reversed, proton conductivity will drastically decrease. In the island-sea structure with an inorganic acid forming the continuous, sea-like phase, the proton can conduct efficiently and at a high speed in the continuous inorganic phase, and, at the same time, the membrane properties can be sufficiently secured, because the carbon-containing phase has the structure of adequate size. The membrane having the above-described structure is self-sustaining while actually securing a proton conductivity of $10^{-3}$S/cm or more, and, at the same time, flexible or soft.

Figure 2:
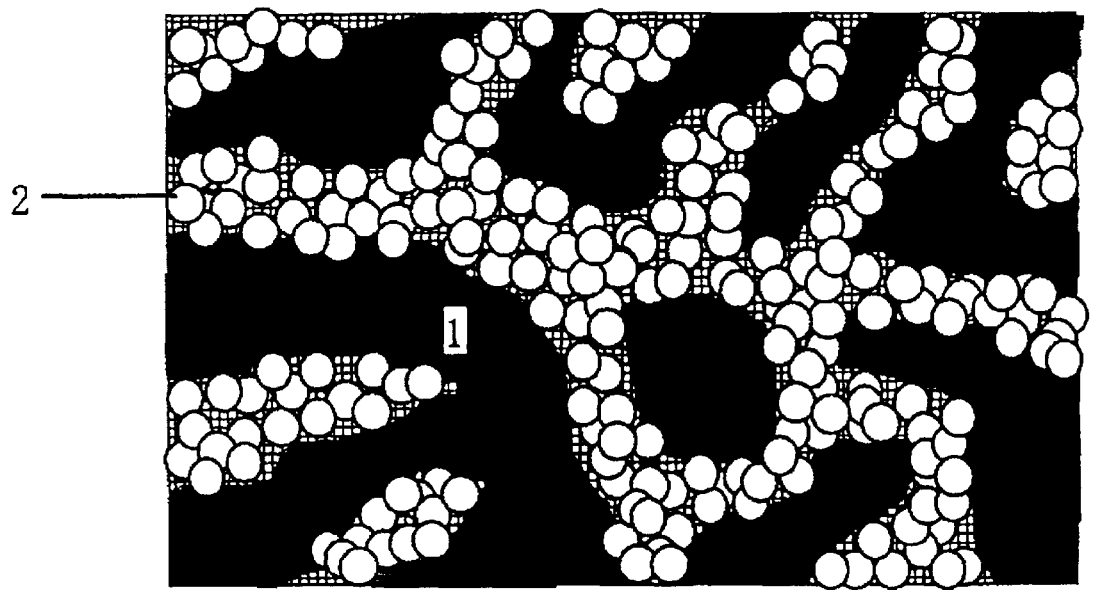
[FIG. 2]

Next, the structure of the present invention where both phases are continuous is described by referring to FIG. 2. Such a structure is characterized by both carbon-containing phase and inorganic phase with an inorganic acid as the major ingredient are continuous. It is essential for the present invention to have the inorganic phase as the continuous phase, as discussed above. Therefore, proton conductivity is not essentially affected whether the organic phase composed of the carbon-containing phase is continuous or taking an island-like structure. In the structure where both phases are continuous, the proton can conduct efficiently and at a high speed in the continuous inorganic phase as in the island-sea structure, and, at the same time, the membrane properties can be sufficiently secured, because the carbon-containing phase has the structure of adequate size. The membrane having such a structure is self-sustaining while actually securing a proton conductivity of $10^{-3}$S/cm or more, and, at the same time, flexible or soft.

Whether the phase structure has the island-sea structure or two continuous phases depends on, e.g., type of the carbon-containing compound, solvent and acid used, and film-making temperature. It is possible to selectively produce each structure, which, however, is not necessary, because both structures can simultaneously achieve good proton conduction and membrane properties. The most important and essential thing for the present invention is to secure continuity of the inorganic phase.

The carbon-containing phase preferably contains at least 80% by volume of a carbon-containing compound, otherwise the softening effect may not be sufficiently realized. The inorganic phase, on the other hand, preferably contains at least 80% by volume of an inorganic acid, otherwise proton conduction may not be sufficiently realized.

The volumetric ratio of each component of the carbon-containing and inorganic phase can be determined from the electron microgram, e.g., that produced by the high-angle scattering dark field STEM method (Z-contrast microgram) taken by a field emission type electron microscope (e.g., JOEL's JEM-2010F).

It is observed by the electron microscopic analysis that the membrane having the structure shown in FIG. 1 shows no scattering portion caused by the inorganic compound in the carbon-containing phase, and shows little low-scattering portion caused by the carbon-containing compound in the inorganic phase, confirming that each compound accounts for at least 95% by volume in its phase. It is also observed that the membrane having the structure shown in FIG. 2 shows no scattering portion caused by the inorganic compound in the carbon-containing phase, and shows little low-scattering portion caused by the carbon-containing compound in the inorganic phase, also confirming that each compound accounts for at least 95% by volume in its phase.

Therefore, the proton-conducting membrane of the present invention can simultaneously achieve high proton conduction and good membrane properties. Moreover, this membrane is also highly resistant to heat by incorporating a thermally stable inorganic compound as the structural material, because the section responsible for proton conduction is not decomposed, unlike that in the conventional electrolyte membrane, and phase-separated structure is stable at high temperature in the presence of the carbon-containing compound. This phase structure can control swelling of the membrane to a minimum extent under a wet condition, producing no stress in the membrane-electrode assembly even when humidity changes while the PEFC is operating.

Therefore, the proton-conducting membrane of the present invention stably exhibits proton conduction over a wide temperature range, and hence is applicable to all types of PEFCs, including a direct fuel type fuel cell.

2. Structural Components of the Proton-conducting Membrane

It is important for the proton-conducting membrane of the present invention, in order to have the above-described island-sea structure or structure where both phases are continuous, that it includes, as the structural components, a three-dimensionally crosslinked silicon-oxygen structure (A), carbon-containing compound (B) bound to (A) via a covalent bond, and inorganic acid (C), and that the skeleton section of the carbon-containing compound (B) satisfy the following relationship:

$$(\delta p^2 + \delta h^2)^{1/2} \leq 7(MPa)^{1/2}$$

wherein, $\delta p$ and $\delta h$ are the polarity and hydrogen bond components of the three-component solubility parameter.

The above components (A), (B) and (C) are described in detail.

3. Three-dimensionally Crosslinked Silicon-oxygen Structure (A)

The three-dimensionally crosslinked silicon-oxygen structure (A) for the present invention helps impart high heat resistance to the proton-conducting membrane after being strongly bound to the carbon-containing compound (B) via covalent bond. The three-dimensionally crosslinked silicon-oxygen structure (A) may be the one with silicon replaced by titanium, zirconium or aluminum. Nevertheless, however, silicon is more preferable for availability of the starting material, reaction simplicity and cost consideration, among others.

The three-dimensionally crosslinked silicon-oxygen structure (A) for the present invention can be generally prepared easily by the so-called sol-gel process where a compound having a hydrolysable silyl group (e.g., alkoxysilyl or halogenated silyl group) as the precursor is hydrolyzed and condensed. The hydrolysable silyl group and carbon-containing compound (B) may be separately incorporated and bound to each other later. However, it is preferable to bind them to each other beforehand from production and membrane performance stability.

The precursors for the three-dimensionally crosslinked silicon-oxygen structure (A) include, in addition to those bound beforehand to (B), compounds having a hydrolysable silyl group, including alkoxysilanes, e.g., tetraethoxysilane, tetramethoxysilane, tetraisopropoxysilane, tetrabutoxysilane, methyltriethoxysilane and dimethyldiethoxysilane; and halogenated silanes, e.g., tetrachlorosilane and methyltrichlorosilane. Moreover, a small quantity of metallic alkoxide, e.g., titanium, zirconium or aluminum alkoxide, may be incorporated, to form the three-dimensionally crosslinked comopound metallic oxide structure and thereby to further reinforce the three-dimensionally crosslinked silicon-oxygen structure (A). In such a case, an alkoxy compound or complex, including alkoxytitanium, e.g., titanium tetraisopropoxide, titanium tetrabutoxide or polymer thereof, titanium complex, e.g., that with acetylacetone, or corresponding aluminum or zirconium compound, may be used. These are condensed with the hydrolysable silyl group bound beforehand to (B), to form the component for the three-dimensionally crosslinked silicon-oxygen structure (A) bound to (B).

4. Carbon-containing Compound (B)

The carbon-containing compound (B) is present in the proton-conducting membrane of the present invention in the form bound to the above-described three-dimensionally crosslinked silicon-oxygen structure (A).

More specifically, the carbon-containing compound (B) for the present invention assumes a role for imparting adequate softness to the proton-conducting membrane, and improving handiness of the membrane itself and facilitating fabrication of the membrane-electrode assembly. At the same time, it forms the phase-separated structure with an inorganic acid (C), after solubility of the compounds (B) and (C) in each other is adjusted, to structure the continuous inorganic acid (C) phase and thereby to realize high conductivity.

The carbon-containing compound (B) preferably has an adequate length for the former role, because crosslinking density can be adjusted by molecular chain length of the compound (B). The "adequate length" as described herein cannot be specified, because it depends on various factors, e.g., branching of the molecular chain, flexibility of the bond and presence or absence of the ring structure. In the bond of the carbon-carbon methylene chain, number of the bonds is preferably around 1 to 50, particularly preferably 2 to 20. The chain having one carbon bond, although useful, may give the fragile membrane. One the other hand, the chain having an excessive length is undesirable, because it may block the ion conduction path to decrease conductivity.

For the latter role, on the other hand, solubility of the compounds (B) and agent for imparting proton conductivity (C) in each other is important, for including the compound (C) in the phase-separated structure. More specifically, the compounds (B) and (C) can be uniformly dispersed, when they are soluble in each other. In such a case, however, proton conductivity, although secured to some extent, is insufficient for a fuel cell. It is necessary to incorporate the compound (C) at a high content in order to sufficiently increase proton conductivity, which, however, is accompanied by the deteriorated membrane properties. On the other hand, when the compounds (B) and (C) are sparingly soluble in each other, they cause phase separation. It is important to note in such a case that the phase-separated structure in which the inorganic acid (C) forms a continuous phase can be realized, when the compound (B) satisfies the specific condition, as described later.

It is not necessary to incorporate the compound (C) at a high content which may deteriorate the membrane properties, when the structure has the continuous inorganic acid (C) phase, as described earlier. It is important that the inorganic acid (C) and carbon-containing compound (B) are sparingly soluble in each other, in order to form the above-described phase-separated structure.

Solubility parameter (SP value) is generally used to discuss solubility of different compounds in each other. Solubility parameter is defined as square root of cohesive energy density, and solubility of different compounds can be predicted by comparing their solubility parameters. For definition and types of solubility parameter, refer to Polymer Handbook (by J. Brandrup and others, fourth edition, VII-675 to 711), which describes the related matter in detail. Of the solubility parameters described, the inventors are particularly interested in the 3-component SP value, proposed by C. M. Hansen (J. Paint Techn., 39, 505, 104 (1967)).

According to this method, the SP value ($\delta$; unit: $(MPa)^{1/2}$) consists of the 3 components of dispersion force ($\delta d$), polarity ($\delta p$) and hydrogen bond ($\delta h$), wherein the total SP is correlated by these components:

$$\delta^2 = \delta d^2 + \delta p^2 + \delta h^2$$

This solubility parameter, broken down into the solubility-related factors, gives very high-quality solubility-related information.

The 3-component solubility factor is proposed for various compounds by Hansen and his successors. Refer to Polymer Handbook (fourth edition, VII-698 to 711), which discusses the parameter in detail.

The inorganic acid (C) is described briefly here, and in more detail later. Widely used inorganic acids include sulfuric, phosphoric, sulfonic and phosphonic acids, but a heteropoly acid is mainly used for the present invention. A strong acid having a low pKa value as the compound (C) gives a high conductivity. However, such an acid is readily soluble in water, and apparently has a high hydrogen bonding property and polarity. In other words, $\delta p$ and $\delta h$ greatly contribute to the 3-component SP value. It is therefore recommended to note the $\delta p$ and $\delta h$ components for controlling solubility with the compound (C), and the inventors of the present invention have noted these components.

Solubility of the carbon-containing compound (B) and inorganic acid (C) in each other is decreased, when the former has a low $\delta p$ and $\delta h$ value, forming the phase-separated structure shown in FIGS. 1 and 2. It is observed, when the $(\delta p^2 + \delta h^2)^{1/2}$ value is found for the joint between the compound (B) and three-dimensionally crosslinked structure (A) after it is substituted by hydrogen (i.e., for the skeleton section of the compound (B)) to be correlated with the phase-separated structure, that dissolution starts when $(\delta p^2 + \delta h^2)^{1/2} \geq 7(MPa)^{1/2}$, making it difficult to form the phase-separated structure, whereas the phase-separated structure is formed when $(\delta p^2 + \delta h^2)^{1/2} \leq 7(MPa)^{1/2}$, particularly notably when $(\delta p^2 + \delta h^2)^{1/2} \leq 5(MPa)^{1/2}$, to form the continuous structure of the inorganic acid (C), thus improving conductivity.

Therefore, it is essential for the present invention that the skeleton section of the carbon-containing compound (B) satisfies the relationship $(\delta p^2 + \delta h^2)^{1/2} \leq 7(MPa)^{1/2}$ for the polarity component $\delta p$ and hydrogen bond component $\delta h$ as the two components of the 3-component solubility parameter.

The carbon-containing compound (B) is not limited so long as it satisfies the above requirement, but preferably has the structure resistant to decomposition by an acid, because it is used together with the inorganic acid (C) for the present invention. The carbon-containing compound (B) is generally stable to acid, when it has a sufficiently low $(\delta p^2+\delta h^2)^{1/2}$ value involving the polarity component δp and hydrogen bond component δh as the two components of the 3-component solubility parameter, because the value is nothing else but the one representing the interactions with an acid.

The preferable skeleton section of the carbon-containing compound (B) which satisfies the relationship $(\delta p^2+\delta h^2)^{1/2} \leq 7(MPa)^{1/2}$ includes a hydrocarbon compound consisting of carbon and hydrogen.

For the polarity component δp and hydrogen bond component δh as the two components of the 3-component solubility parameter, most hydrocarbons are zero or very close thereto for each component, when they are free of unsaturated bond. Therefore, they can be suitably used to form the phase-separated structure.

The other hydrocarbons can also satisfy the relationship $(\delta p^2+\delta h^2)^{1/2} \leq 7(MPa)^{1/2}$, even when they have an unsaturated bond, e.g., aromatic.

Therefore, a hydrocarbon compound is suitable for the skeleton section of the carbon-containing compound (B) for its structure controllability and stability to acid.

The examples of the skeleton sections of hydrocarbon compounds include straight-chain or branched paraffins having a chain structure of —$(CH_2)_n$—, e.g., ethane, propane, butane, pentane, hexane, heptane, octane, nonane, decane, undecane, dodecane, tridecane, tetradecane, pentadecane, hexadecane, heptadecane, octadecane, nonadecane and eicosane; and aromatic compounds, e.g., benzene, diethyl benzene, biphenyl, diethyl biphenyl, terphenyl, diethyl terphenyl, quarter phenyl, diethyl quarterphenyl, naphthalene derivative, anthracene derivative, pyrene derivative, and a substituted compound thereof. The derivatives of the above compounds, e.g., those substituted by fluorine, may be used, so long as they satisfy the requirement $(\delta p^2+\delta h^2)^{1/2} \leq 7(MPa)^{1/2}$.

When the above compound is to be used as the carbon-containing compound (B), it should be bound to the three-dimensionally crosslinked silicon-oxygen structure (A) via at least one covalent bond. Otherwise, it will be a paraffin compound or the like which is gaseous, liquid or molten at high temperature, and inapplicable to a proton-conducting membrane serviceable at high temperature. It is preferably bound to the structure (A) via 2 or more bonds. Extent of crosslinking will be insufficient, when it is bound to the structure (A) via only one bond, possibly leading to insufficient membrane strength and easily broken phase-separated structure. On the other hand, the compound (B) bound to the structure (A) via 3 or more bonds can be used, so long as the membrane is kept flexible. A carbon-containing compound having no bond with the structure (A) and the one having one bond may be included, provided that the compound (B) having 2 or more bonds is included at a sufficient content and membrane flexibility and conduction stability are secured. The minimum content of the compound (B) having 2 bonds with the structure (A) is normally 50% by weight or more, although not sweepingly generalized, because it varies with molecular length of the compound (B).

When the structure (A) and compound (B) are bound to each other via 2 bonds, and a saturated hydrocarbon is used as the skeleton section, the compound represented by the following formula (1) is preferable. It is bound to the three-dimensionally crosslinked silicon-oxygen structure (A) at both terminals of the methylene chain.

 (1)

wherein, "n" as the number of the methylene chains is an integer of 2 to 20, preferably 4 to 14. When "n" is 1, the membrane will be fragile. When "n" is more than 20, on the other hand, the effect of improving resistance to heat by the three-dimensionally crosslinked silicon-oxygen structure (A) will be reduced, and the inorganic acid (C) phase tends to be broken to decrease proton conductivity.

When the structure (A) and compound (B) are bound to each other via 2 bonds, and an unsaturated hydrocarbon is used as the skeleton section, the compound represented by the following formula (2) is preferable. It is bound to the three-dimensionally crosslinked silicon-oxygen structure (A) at both terminals of the ethylene group at both terminals of the aromatic ring.

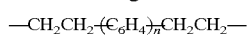 (2)

wherein, "n" as the number of the phenylene group is a natural number of 4 or less. The position at which the phenyl group is substituted is not limited; it may be ortho, metha or para position, or a mixture thereof. The compound with "n" of 5 or more is not desirable, because of hardness to obtain.

Another type of compound which satisfies the relationship $(\delta p^2+\delta h^2)^{1/2} \leq 7(MPa)^{1/2}$ is alkyl siloxane. One of the representative examples of the skeleton section of the compound (B) bound to the structure (A) via 2 bonds is the compound represented by the following formula (3). It is bound at both terminals of the siloxane bond.

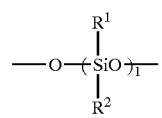 (3)

wherein, $R^1$ and $R^2$ are each a group selected from the group consisting of $CH_3$, $C_2H_5$ and $C_6H_5$; and "l" as the number of the siloxane group is an integer of 2 to 20, preferably 3 to 10. When "l" is 1, the membrane will be fragile. When "l" is more than 20, on the other hand, the inorganic acid (C) phase tends to be broken to decrease proton conductivity.

5. Inorganic Acid (C)

The proton-conducting membrane of the present invention comprises an inorganic acid (C), in addition to the above-described three-dimensionally crosslinked silicon-oxygen structure (A) and carbon-containing compound (B).

The inorganic acid for the present invention is responsible for increasing proton concentration in the proton-conducting membrane. Increased proton concentration is essential for realization of high proton conductivity for the present invention, in consideration of proton conductivity increasing in proportion to concentrations of proton and the proton-conducting medium (generally of water supplied separately).

The so-called protonic acid compound, which releases the proton, is used as the inorganic acid (C) as the agent for imparting proton conductivity. Types of the inorganic acid (C) as the agent for imparting proton conductivity include phosphoric, sulfuric, sulfonic, carboxylic, boric and heteropoly acid, and a derivative thereof. These acids may be used either individually or in combination for the present invention.

Of these, a heteropoly acid is more preferable for its resistance to heat and stability in the membrane, where heteropoly acid is a generic term for inorganic oxo acids, of which tungstophosphoric, molybdophosphoric and tungstosilicic acid of Keggin or Dawson structure are more preferable.

These heteropoly acids have sufficiently large molecular sizes to control elution of the acid out of the membrane to a considerable extent, even in the presence of water or the like. Moreover, they have ionic polarity and capacity of being bonded to hydrogen, and are efficiently separated from the carbon-containing compound (B) phase to increase proton conductivity, as described earlier, and retained in the membrane by the polarity interactions with the silicon-oxygen bond to control elution of the acid out of the membrane. As such, they are especially suitable for the proton-conducting membrane which works at high temperature for extended periods.

The heteropoly acid may be supported beforehand by fine particles of metallic oxide, to be stably immobilized in the membrane. These metallic oxides include silica, alumina, titanium and zirconium. These fine particles are provided by various makers. For example, CHEMAT TECHNOLOGY, INC is supplying the fine particles of various metallic oxides dispersed in water, alcohol or the like, and Nippon Aerosil Co., LTD. is supplying fine particles of various types of silica.

Size of these fine particles of metallic oxide is not limited, but preferable size is normally in a range from 10 nm to 100 $\mu$m. Those having a size below 10 nm are hard to obtain and limited in supporting effect. On the other hand, those having a size above 100 $\mu$m are too large for membrane thickness, and may work as the fracture origins in the membrane.

The heteropoly acid can be easily supported by the fine metallic oxide particles by mixing them in a solution. The solution containing the heteropoly acid and fine metallic oxide particles may be concentrated to produce the solids which are to be crushed. Moreover, the heteropoly acid supported by the fine metallic oxide particles may be used together with a free heteropoly acid not supported.

Of the inorganic solid acids, tungstophosphoric, molybdophosphoric and tungstosilicic acid are especially preferable in consideration of their high acidity, large size and magnitude of the polarity interactions with the metal-oxygen bond.

The heteropoly acid may be used together with another acid as described earlier, or with two or more other organic or inorganic acids for the inorganic acid (C).

6. Content Ratio of Each Component

The proton-conducting membrane of the present invention comprises, as the essential components, the three-dimensionally crosslinked silicon-oxygen structure (A), carbon-containing compound (B) bound to (A) via a covalent bond and inorganic acid (C), as described earlier. Of these components, the inorganic acid (C) is incorporated preferably at 10 to 300 parts by weight per 100 parts by weight of the three-dimensionally crosslinked silicon-oxygen structure (A) and carbon-containing compound (B) totaled.

At below 10 parts by weight of the inorganic acid (C) per 100 parts by weight of the three-dimensionally crosslinked silicon-oxygen structure (A) and carbon-containing compound (B) totaled, good proton conductivity of the membrane may not be expected. At above 300 parts by weight, on the other hand, the phase-separated structure and membrane properties may no longer be secured, and, at the same time, the inorganic acid (C) may not be sufficiently held by the three-dimensionally crosslinked silicon-oxygen structure (A) and carbon-containing compound (B), and released out of the membrane.

7. Other Optional Components

The proton-conducting membrane of the present invention comprises (A) to (C) as the essential components, as described earlier, and may be incorporated with other optional components, within limits not harmful to the object of the present invention. These optional components include fine particles of metallic oxide (e.g., silica, titanium oxide, alumina or zirconia), inorganic mineral (e.g., smectite, montmorillonite or talcite), metal (e.g., platinum or palladium); and further glass mat, resin mat, glass fibers or resin fibers.

The optional components further include reinforcing agent, softening agent, surfactant, dispersant, reaction promoter, stabilizer, colorant, antioxidant, and inorganic or organic filler.

8. Methods of Producing the Proton-conducting Membrane

The proton-conducting membrane of the present invention comprises, as the essential components, the three-dimensionally crosslinked silicon-oxygen structure (A), carbon-containing compound (B) bound to (A) via a covalent bond and inorganic acid (C), characterized by the phase-separated structure in which the inorganic acid (C) forms the continuous phase, when the membrane of the composite of these components is produced.

As described earlier in DESCRIPTION OF THE RELATED ART, a membrane in which an organic material, structure three-dimensionally crosslinked by a metal-oxygen bond, and inorganic acid or acid group (e.g., sulfonic or phosphonic acid group) with an introduced side chain of organic material are uniformly dispersed and mixed is known. Such a mixture, however, cannot simultaneously satisfy the objects of the present invention, e.g., imparting softness to the membrane, securing high proton conductivity and improving resistance to heat. In the case of the mixed/dispersed system, it is necessary to incorporate a large quantity of acid or introduce an acid group which can impart proton conductivity, in order to improve proton conductivity, which is invariably accompanied by deteriorated membrane properties. For resistance to heat, incorporation of an inorganic material or the like does improve the resistance, but mere incorporation cannot give the resistance greatly exceeding that of the organic material itself incorporated in the membrane, and will fail to achieve the satisfactory results.

In the proton-conducting membrane of the present invention, on the other hand, the three-dimensionally crosslinked silicon-oxygen structure (A) and carbon-containing compound (B) are bound to each other to greatly improve resistance to heat, and the phase-separated structure in which the inorganic acid (C) forms a continuous phase is established to simultaneously realize a high proton conductivity and good membrane properties.

The proton-conducting membrane of the present invention can be produced by various methods, e.g., one of the following 3 methods 1) to 3), described below:

1) This method comprises 3 steps; the first step mixes a carbon-containing compound (D) having at least one substituent (e.g., hydrolysable silyl group) capable of forming the three-dimensional crosslinked structure (A) containing a silicon-oxygen bond with the inorganic acid (C), the second step makes the above mixture into a film by a known method, and the third step hydrolyzes/condenses the substituent (e.g., hydrolysable silyl group) capable of forming the three-dimensional crosslinked structure (A) containing a silicon-oxygen bond (the so-called sol-gel process), to form the three-dimensional crosslinked structure (A) and produce the objective proton-conducting membrane therefrom.

2) This method prepares a reaction system containing a carbon-containing compound (D) having a substituent (e.g., hydrolysable silyl group) capable of forming the three-dimensional crosslinked structure (A) containing a silicon-oxygen bond; makes the above mixture into a film by a known method; forms the three-dimensional crosslinked structure (A) in the film by the sol-gel process in the presence of water or its vapor; and brings the resultant film into contact with the solution containing the inorganic acid (C) to incorporate it into the film, to produce the objective proton-conducting membrane.

3) This method produces a film from the three-dimensional crosslinked structure (A) containing a silicon-oxygen bond having a group capable of being bound to the carbon-containing compound (B) via a covalent bond (for example, group having an unsaturated bond, e.g., vinyl group, or functional group capable of being bound to another compound via a covalent bond, e.g., hydroxyl, amino or isocyanate group); and impregnates the resultant film with the carbon-containing group having a substituent capable of being bound to the carbon-containing compound (B) via a covalent bond and also with the inorganic acid (C) to form the covalent bond between the structure (A) and compound (B), to produce the objective proton-conducting membrane.

It is the object of the present invention, as described earlier, to provide the proton-conducting membrane comprising the three-dimensionally crosslinked silicon-oxygen structure (A), carbon-containing compound (B) bound to (A) via a covalent bond and inorganic acid (C) as the essential components, wherein the phase-separated structure in which the inorganic acid forms the continuous phase is established when the membrane of the composite of these components is produced. Therefore, the method for producing such a membrane is not limited, so long as the object is satisfied. However, the above-described method 1) is more preferable because of, e.g., its handling simplicity, reliability and investment cost.

The above method 1) is described in the order of steps to explain, in more detail, the method for producing the proton-conducting membrane of the present invention.

The method of the present invention for producing the proton-conducting membrane includes the first step for preparing the mixture which contains the carbon-containing compound (D) having at least one hydrolysable silyl group and inorganic acid (C).

A hydrolysable silyl group is preferable as the substituent capable of forming the three-dimensional crosslinked structure (A) containing a silicon-oxygen bond. The compounds having a hydrolyzable silyl group useful for the present invention include trialkoxysilyl group, e.g., trimethoxysilyl, triethoxysilyl, triisopropoxysilyl and triphenoxysilyl; trihalogenated silyl group, e.g., tricholorosilyl; those having a dialkoxy or di-halogenated silyl group, e.g., methyldiethoxysilyl, methyldimethoxysilyl, ethyldiethoxysilyl, ethyldimethoxysilyl, methyldichlorosilvl and ethyldichlorosilyl; those having a monoalkoxy or monohalogenated silyl group, e.g., dimethylethoxysilyl, dimethylmethoxysilyl and dimethylchlorosilyl; and those having a hydroxysilyl group. Various compounds having a hydrolyzable silyl group are easily available at low cost from the markets, and it is easy to control the sol-gel process for producing the three-dimensionally crosslinked structure containing a silicon-oxygen bond.

The above compound may be incorporated with a hydrolyzable metallic compound which gives another metal oxide (e.g., titanium, zirconium or aluminum oxide). These metallic compounds include carbon-containing compounds having a substituent, e.g., mono-, di- or tri-alkoxide of titanium, zirconium or aluminum, or complex with acetylacetone or the like. Content of the hydrolyzable metallic compound other than silicon compound is not limited, but preferably 50% by mol or less on the hydrolysable silyl group for cost and easiness of controlling the reaction.

A hydrolysable inorganic compound may be incorporated as the precursor for the three-dimensionally crosslinked structure containing a metal-oxygen bond but having no bond with the carbon-containing compound (D). These inorganic compounds include alkoxysilicates, e.g., tetraethoxysilane, tetramethoxysilane, tetraisopropoxysilane, tetra-n-butoxysilane, tetra-t-butoxysilane, and their monoalkyl and dialkyl derivatives; phenyltriethoxysilane, halogenated silane, tetraethoxy titanate, tetraisopropoxy titanate, tetra-n-butoxy titanate, tetra-t-butoxy titanate, and their monoalkyl and dialkyl derivatives; alkoxy titanate and its oligomers containing a compound, e.g., acetylacetone or the like substituted with a group for controlling crosslinking reaction rate; and alkoxy zirconate.

Content of the hydrolysable metallic compound having no bond with the carbon-containing compound (D) is preferably 30% by mol or less on the carbon-containing compound (D) having one hydrolysable silyl group. At above 30% by mol, the carbon-containing phase and inorganic phase may not be clearly separated from each other, and high proton conductivity may not be obtained.

It is the object of the present invention, as described earlier, to provide the proton-conducting membrane comprising the three-dimensionally crosslinked silicon-oxygen structure (A), carbon-containing compound (B) bound to (A) via a covalent bond and inorganic acid (C) as the essential components, wherein the phase-separated structure in which the inorganic acid forms the continuous phase is established when the membrane of the composite of these components is produced. Therefore, it is necessary for the carbon-containing compound (D) having at least one hydrolysable silyl group for the present invention to have a phase-separable structure.

Solubility of the proton-conducting membrane of the present invention can be described by solubility parameter (SP value) as explained for the carbon-containing compound (B). The carbon-containing compound (D) is the precursor for the compound (B), and hence the conditions for the compound (B) are directly applicable to those for the compound (D).

In other words, it is necessary for the carbon-containing compound substituted with hydrogen, i.e., the skeleton section, to satisfy the relationship $(\delta p^2 + \delta h^2)^{1/2} \leq 7(MPa)^{1/2}$ (wherein, $\delta p$ and $\delta h$ are the components of the three-component solubility parameter), except the hydrolyzable silyl group in the compound (D). Moreover, the compound (D) preferably has 2 hydrolyzable silyl groups in order to produce the proton-containing membrane of higher strength, because the group is the precursor for the three-dimensionally crosslinked structure containing a silicon-oxygen bond. Extent of crosslinking will be insufficient in the membrane subjected to the sol-gel reaction, when the compound (D) has only one hydrolysable silyl group, because membrane strength may be insufficient and the phase-separated structure may be easily broken.

It should be noted, however, a carbon-containing compound having no hydrolysable silyl group, or the one having 1 or 3 hydrolyzable silyl groups may be included, provided that the compound (D) having 2 hydrolyzable silyl groups is included at a sufficient content. Content of the compound (D) having 2 hydrolyzable silyl groups is normally 50% by weight or more, although not sweepingly generalized, because the required content varies with molecular length and structure of the compound (D) having 2 hydrolyzable silyl groups.

One example of the compound (D) having 2 hydrolyzable silyl groups is the compound represented by the following formula (4):

$$(R^3)_{3-m}X_mSi-R^4-SiX_m(R^3)_{3-m} \qquad (4)$$

wherein, $R^3$ is a group selected from the group consisting of $CH_3$, $C_2H_5$ and $C_6H_5$; $R^4$ is a hydrocarbon consisting of carbon and hydrogen atoms; X is a group selected from the group consisting of Cl, $OCH_3$, $OC_2H_5$ and $OC_6H_5$; "m" is a natural number of 3 or less.

For the polarity component δp and hydrogen bond component δh as the two components of the 3-component solubility parameter, most hydrocarbons are zero or very close thereto for each component, when they are free of unsaturated bond. Therefore, they can be suitably used to form the phase-separated structure. The other hydrocarbons can also satisfy the relationship $(\delta p^2+\delta h^2)^{1/2} \leq 7(MPa)^{1/2}$, e when they have an unsaturated bond, e.g., aromatic. Therefore, a hydrocarbon compound is suitable for the skeleton section of the carbon-containing compound (D) having 2 hydrolyzable silyl groups, for its structure controllability and stability to acid.

The examples of the skeleton sections of hydrocarbon compounds include straight-chain or branched paraffins having a chain structure of $-(CH_2)_n-$, e.g., ethane, propane, butane, pentane, hexane, heptane, octane, nonane, decane, undecane, dodecane, tridecane, tetradecane, pentadecane, hexadecane, heptadecane, octadecane, nonadecane and eicosane. Of these, the straight-chain compounds include the compound represented by the following formula (5):

$$(R^3)_{3-m}X_mSi-(CH_2)_n-SiX_m(R^3)_{3-m} \qquad (5)$$

wherein, $R^3$ is a group selected from the group consisting of $CH_3$, $C_2H_5$ and $C_6H_5$; X is a group selected from the group consisting of Cl, $OCH_3$, $OC_2H_5$ and $OC_6H_5$; "m" is a natural number of 3 or less; and "n" is an integer of 2 to 20.

The compound represented by the formula (5) is commercialized when number of carbon atoms is 9 or less (e.g., available from Gelest Inc.). Those having more carbon atoms can be produced by the so-called hydrosilylation process where an α, ω diene compound as a straight-chain hydrocarbon is reacted with a compound with the Si—H bond in the presence of a catalyst, e.g., chloroplatinic acid.

On the other hand, those having an aromatic structure as the skeleton section include benzene, diethyl benzene, biphenyl, diethyl biphenyl, terphenyl, diethyl terphenyl, quarter phenyl, diethyl quarterphenyl, naphthalene derivative, anthracene derivative, pyrene derivative, and a substituted compound thereof.

These compounds are represented by the following formula (6):

$$(R^3)_{3-m}X_mSi-CH_2CH_2-(C_6H_4)_n-CH_2CH_2-SiX_m(R^3)_{3-m} \qquad (6)$$

wherein, $R^3$ is a group selected from the group consisting of $CH_3$, $C_2H_5$ and $C_6H_5$; X is a group selected from the group consisting of Cl, $OCH_3$, $OC_2H_5$ and $OC_6H_5$; "m" is a natural number of 3 or less; and "n" is a natural number of 4 or less.

Of these, the one of n=1 is commercially available (e.g., from Gelest Inc.), and those of n=2 or more can be obtained by hydrosilylation of diethylene biphenyl commercially available from, e.g., Nippon Steel Chemical.

The derivative represented by the formula (5) or (6) is not limited, so long as it satisfies the relationship $(\delta p^2+\delta h^2)^{1/2} \leq 7(MPa)^{1/2}$. It may be substituted with, fluorine.

Another example of the compounds having 2 hydrolyzable silyl group which satisfies the relationship $(\delta p^2+\delta h^2)^{1/2} \leq 7(MPa)^{1/2}$ is those having alkyl silo the skeleton section.

These compounds are represented by the following formula (7):

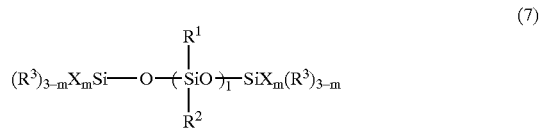

wherein, $R^1$, $R^2$ and $R^3$ are each a group selected from the group consisting of $CH_3$, $C_2H_5$ and $C_6H_5$; X is a group selected from the group consisting of Cl, $OCH_3$, $OC_2H_5$ and $OC_6H_5$; "m" is a natural number of 3 or less; and "1" is an integer of 2 to 20.

The specific compound represented by formula (7) is the one of 1=10, available from Shin-Etsu Silicone.

The inorganic acids useful for the component (C), described in 5. Inorganic acid (C), include sulfuric, phosphoric, sulfonic, boric, heteropoly acid, and a protonic acid compound as the derivative thereof. Of these, a heteropoly acid, e.g., tungstophosphoric, molybdophosphoric or tungstosilicic acid, is more preferable.

In the first step, an adequate solvent may be used. The solvents useful for the present invention include alcohols, e.g., methanol, ethanol, isopropanol, n-butanol, and t-butanol; and ethers, e.g., tetrahydrofuran and dioxane. The solvents are not limited to the above, and any one may be used so long as it is useful for dissolution or mixing the organic material, metal alkoxide and the like.

Ratio of the solvent is not limited, but the content is preferably adjusted to give a solids concentration of 80 to 10% by weight.

The first step may use various additives, described in Section 7, Other optional components.

Then, the first step mixes the inorganic acid (C) with the carbon-containing compound (D) having at least one hydrolyzable silyl group, to prepare the precursor solution (reaction system containing the starting mixture for forming the membrane). The solution containing the compound (D) and that containing the compound (C) may be separately prepared beforehand and then mixed with each other, or these starting materials may be simultaneously mixed to simplify the process.

It is preferable to mix 10 to 300 parts by weight of the inorganic acid (C) with 100 parts by weight of the carbon-containing compound (D) having at least one hydrolyzable silyl group. At below 10 parts by weight, a sufficiently high proton conductivity may not be obtained. At above 300 parts by weight, on the other hand, the membrane may be fragile, or the compound (C) may be separated from the membrane.

The method of the present invention for producing the proton-conducting membrane includes the second step for making a film of the above precursor solution by a known method, e.g., casting or coating.

The film-making method is not limited, so long as it can give the uniform film. The film thickness can be optionally controlled at 10 μm to 1 mm, and adequately selected in consideration of proton conductivity, fuel permeability and mechanical strength of the membrane. The thickness is not limited, but preferable thickness on a dry basis is normally in a range from 30 to 300 μm.

The method of the present invention for producing the proton-conducting membrane includes the third step which hydrolyzes/condenses the substituent (e.g., hydrolysable silyl group) capable of forming the three-dimensional crosslinked structure (A) containing a silicon-oxygen bond (the so-called sol-gel process), to form the three-dimensional crosslinked structure (A).

The third step can produce the objective membrane by the so-called sol-gel process, in which the above film is treated at an optional temperature in a range from room temperature to 300° C. The film may be heated in the third step by a known method, e.g., heating by an oven or autoclave under elevated pressure.

In order to effect the hydrolysis/condensation more efficiently in the third step, the precursor solution may be incorporated beforehand with water (E), or the film may be heated in the presence of steam.

Content of water (E), when incorporated, is not limited so long as it does not cause separation of the precursor solution or other problems. Generally, it is preferably incorporated at 0.1 to 50 mol equivalents for the hydrolysable silyl group. When the inorganic acid (C) has water of crystallization, it may be used without intentionally adding water (E).

When the sol-gel process is effected in the presence of steam, the system is preferably kept at a relative humidity of 60% or more, particularly preferably in the presence of saturated steam. Thus, the hydrolysis/condensation process proceeds efficiently in the presence of water, either incorporated in the precursor solution as the component (E) or steam, to give the thermally stable membrane.

In order to accelerate formation of the three-dimensionally crosslinked structure, an acid, e.g., hydrochloric, sulfuric or phosphoric acid, may be incorporated as the catalyst beforehand in the reaction system. Formation of the three-dimensionally crosslinked structure is accelerated also in the presence of an alkali, and hence an alkaline catalyst (e.g., ammonia) may be used. However, use of an acid is more preferable, because a basic catalyst reacts highly possibly with the agent for imparting proton conductivity.

It is preferable to effect the third step at 100 to 300° C., or adopt an aging step effected at 100 to 300° C. subsequent to the third step for the method of the present invention.

The proton-conducting membrane of the present invention, when to be used at high temperature of 100° C. or higher, is preferably heated at temperature exceeding service temperature. It may be heated directly during the third step which is effected at 100 to 300° C. Or else, the third step is effected at 5 to 40° C. for 2 hours or more for curing the membrane by the sol-gel process, and then followed by a step effected at 100 to 300° C. The third step is more preferably effected at 5 to 40° C. for 2 hours or more to realize the phase-separated structure, and then followed by the aging step effected at 100 to 300° C. for the proton-conducting membrane of the present invention, for which it is essential to realize the structure in which the carbon-containing compound (B) and inorganic acid (C) phases are separated from each other.

The membrane undergoing the first to third steps may be washed with water, as required, which is preferably free of metallic ion, e.g., distilled or ion-exchanged water.

The membrane thus prepared may be further irradiated with ultraviolet ray or electron beams, to further deepen extent of crosslinking.

The membrane undergoing the first to third steps may be further coated, once or more, with a compound (F) having a hydrolysable silyl group, which is then subjected to hydrolysis/condensation.

The crosslinkable compound, spread over the membrane once prepared and crosslinked, partly penetrates into the membrane to reinforced the portion not crosslinked and, at the same time, form the thin, crosslinkable film over the membrane surface. This film controls fluctuations of moisture content in the membrane, thereby allowing the membrane to stably exhibit proton conduction even at high temperature.

The compound (F) having a hydrolysable silyl group is not limited, so long as it has two or more hydrolysable silyl groups, or may be the same as the carbon-containing compound (D) having one or more hydrolysable silyl groups. Moreover, it may be a tetraalkoxysilane, e.g., tetraethyxysllane or tetramethyxysilane, which may be substituted. An acid is not the essential component for the composition to be spread over the membrane, i.e., it may contain or not contain an acid. Moreover, it may be adjusted at an adequate concentration with a solvent.

The membrane may be coated with the compound (F) having a hydrolysable silyl group by a known method, e.g., dipping, coating or casting, and the compound may be adjusted at an adequate concentration with a solvent or the like.

The coating step may be repeated, but preferably limited to 3 times, to simplify the process.

The proton-conducting membrane thus produced is an innovative organic/inorganic composite membrane having unprecedentedly high heat resistance and durability, and high proton conductivity even at elevated temperature, and can be suitably used as the membrane for fuel cells. When the proton-conductive membrane of the present invention is used for fuel cells, the so-called membrane/electrode assembly with the membrane joined to the catalyst-carrying electrode is formed.

The method for producing the membrane/electrode assembly is not limited: it may be produced by an adequate method, e.g., hot pressing or coating the membrane or electrode with a proton-conductive composition.

The proton-conducting membrane of the present invention is applicable not only to an electrolyte membrane of PEFCs but also to, e.g., electrolyte of capacitors, chemical sensors and ion-exchanging membranes.

PREFERRED EMBODIMENTS

The present invention is described more concretely by EXAMPLES, which by no means limit the present invention. All of the compounds, solvents and the like used in EXAMPLES and COMPARATIVE EXAMPLES were commercial ones. They were used directly, i.e., not treated for these examples. Properties of the proton-conducting membrane prepared were evaluated by the analytical methods described below.

Analytical Methods (1) Evaluation of Membrane Properties

The proton-conducting membrane was subjected to the bending functional test, and its properties were rated according to the following standards:

o: the membrane can be bent x: The membrane cannot be bent, easily broken, or decomposed or molten, when bent (2) Evaluation of Proton Conductivity at Low Temperature The proton-conducting membrane of the present invention was coated with carbon paste (Conducting Graphite Paint: LADO RESEARCH INDUSTRIES, INC) on both sides, to which a platinum plate was fast adhered. It was analyzed for its impedance an electrochemical impedance meter (Solartron, model 1260) in a frequency range from 0.1 Hz to 100 kHz, to determine its proton conductivity.

In the above analysis, the sample was supported in an electrically insulated closed container, and measured for its proton conductivity at varying temperature in a water vapor atmosphere (95 to 100% RH), where cell temperature was increased from room temperature to 160° C. by a temperature controller. The value measured at 60° C. is reported in this specification as the representative one. Moreover, the results obtained at 140° C. are also reported for representative EXAMPLES. For the measurement at 140° C., the measurement tank was pressurized to 5 atms.

(3) Evaluation of Heat Resistance

The proton-conducting membrane was heated at 140° C. for 5 hours in an oven in a saturated steam atmosphere. The treated membrane was evaluated for its heat resistance by the visual and bending functional tests, and its heat resistance was rated according to the following standards:

○: the membrane can be bent
×: The membrane cannot be bent, easily broken, or decomposed or molten, when bent

EXAMPLE 1

A solution of 0.8 g of 1,8-bis(triethoxysilyl)octane (Gelest Inc.) dissolved in 1.5 g of isopropyl alcohol was prepared. Another solution of 0.7 g of tungstophosphoric acid of n-th hydrate (Wako Pure Chemical Industries) dissolved in 1.5 g of isopropyl alcohol was separately prepared. These solutions were mixed with each other, stirred for several minutes, and poured into a Petri dish of polystyrene (Yamamoto Seisakusho, inner diameter: 8.4 cm), where the mixture was left at room temperature (20° C.) for 15 hours and heated at 60° C. for 10 hours in a saturated steam atmosphere, to prepare the transparent membrane. It was washed in a flow of water at 60° C., before it was analyzed. The evaluation results are given in Table 1.

Figure 3:
[FIG. 3]

The membrane thus prepared was analyzed by a field emission type electron microscope (e.g., JOEL's JEM-2010F) to produce the Z-contrast microgram, which is given in FIG. 3.

In FIG. 3, the white portion represents the portion derived from tungsten or the like having a high atomic weight, i.e., the phase mainly comprising tungstophophoric acid used as the inorganic acid. The dark portion, on the other hand, corresponds to the carbon-containing phase of relatively low molecular weight, derived from bis(triethoxysilyl)octane. In the membrane prepared in EXAMPLE 1, where the skeleton section of the carbon-containing material is the saturated hydrocarbon having $(\delta p^2+\delta h^2)^{1/2}$ of almost 0(MPa)$^{1/2}$, it is apparent that the phase-separated structure with the inorganic acid forming the continuous phase is realized. There is a clear contrast between the phase containing the carbon-containing compound and that containing the inorganic acid, clearly indicating that they are separated essentially without being mixed with each other.

Moreover, there is a clear contrast between the sea portion and island portion in the microgram of the membrane prepared in EXAMPLE 1, indicating that the sea-island structure with the inorganic acid phase as the continuous phase is formed.

COMPARATIVE EXAMPLE 1

(Synthesis of Polytetramethylene Oxide with Triethoxysilyl Group at the Terminals)

75.0 g (115.4 mmols) of polytetrametyhylene glycol #650 (Wako Pure Chemical Industries, weight-average molecular weight: 650) was put in a dried glass container, to which 57.1 g (230.8 mmols) of 3-triethoxysilylpropyl isocyanate (Shin-Etsu Silicone, KBE-9007) was added, and the mixture was slowly stirred at 60° C. for 120 hours in a nitrogen atmosphere, for the following reaction:

HO(CH$_2$CH$_2$CH$_2$CH$_2$O)$_n$H+2OCNCH$_2$CH$_2$CH$_2$Si(OC$_2$H$_5$)$_3$→
(OC$_2$H$_5$)$_3$SiCH$_2$CH$_2$CH$_2$NHCOO(CH$_2$CH$_2$CH$_2$CH$_2$O)$_n$CONHCH$_2$CH$_2$CH$_2$Si(OC$_2$H$_5$)$_3$

The viscous liquid obtained was tested by H$^1$-NMR (BRUKER Japan, DRX-300), and the spectral pattern, reasonably considered to be relevant to a polytetramethylene oxide with triethoxysilyl groups at the terminals, was observed. The product was considered to be almost pure, as no impurity signal was observed within the detectable sensitivity of NMR. The compound thus produced had the silicon atoms derived from the hydrolyzable silyl group (triethoxysilyl group) at 4.9 wt. %, based on the total composition.

(Preparation of Mixed Solution and Film-making)

The membrane was prepared in the same manner as in EXAMPLE 1, except that 0.8 g of polytetramethylene oxide with triethoxysilyl at the terminal and 0.8 g of tungstophosphoric acid (Wako Pure Chemical Industries) were used. The mixed solution was stirred for several minutes, and poured into a Petri dish of polystyrene (Yamamoto Seisakusho, inner diameter: 8.4 cm), where the mixture was left at room temperature (20° C.) for 15 hours and heated at 60° C. for 10 hours in a saturated steam atmosphere, to prepare the transparent membrane. The evaluation results are given in Table 1.

The resultant membrane was analyzed by a field emission type electron microscope in the same manner as in EXAMPLE 1. The microgram is given in FIG. 5.

Figure 5:
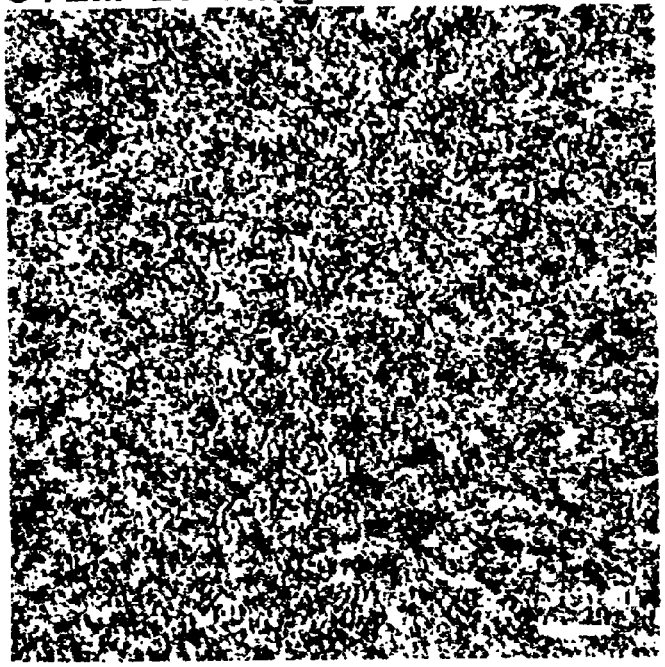
[FIG. 5]
Figure 5:
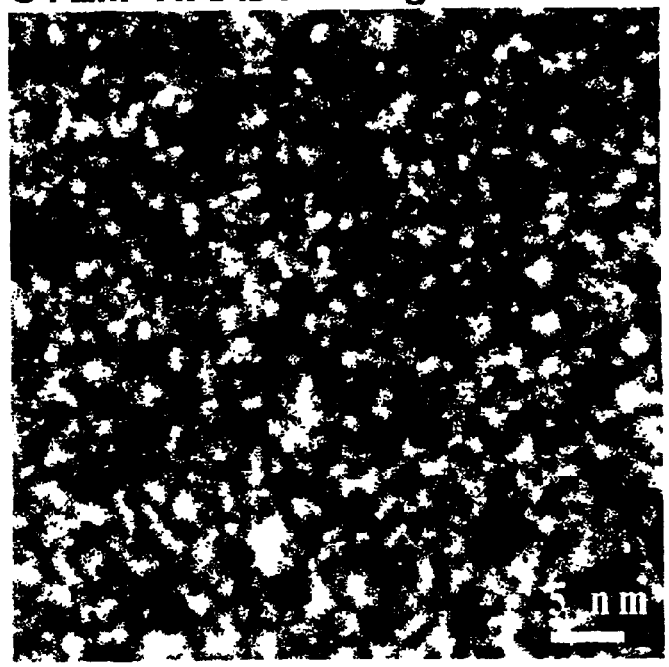

Also in FIG. 5, the white portion represents tungstophosphoric acid used as the agent for imparting proton conductivity, and the dark portion corresponds to the carbon-containing phase of relatively low molecular weight, derived from tetramethylene glycol modified by triethoxy silyl group at both terminals. It is apparent in this case that tungstophosphoric acid used as the agent for imparting proton conductivity is dispersed almost uniformly in the carbon-containing phase. The tetramethylene glycol modified by triethoxy silyl group at both terminals contains the ether or urethane bond, and has $(\delta p^2+\delta h^2)^{1/2}$ exceeding 7(MPa)$^{1/2}$ other words, it is apparent that the structure is not phase-separated (e.g., sea-island structure) but uniformly dispersed, when $(\delta p^2+\delta h^2)^{1/2}$ exceeds 7(MPa)$^{1/2}$.

EXAMPLE 2

The membrane was prepared in the same manner as in EXAMPLE 1, except that 1,8-bis(triethoxysilyl)octane was replaced by 0.8 g of 1,6-bis(trimethoxysilyl)hexane (Gelest Inc.) and 0.8 g of tungstophosphoric acid was used. The evaluation results are given in Table 1.

EXAMPLE 3

(Synthesis of (1,14-bis(triethoxysilyl)tetradecane)

This compound was synthesized in accordance with the method described in detail by, e.g., W. Oviatt et. al. (Chem. Mater., 1993, 5, 943).

A mixture of 25 g of 1,13-tetradecadiene (Aldrich), 44.4 g of triethoxysilane (Shin-Etsu Silicone) and 0.1 mL of 3% xylene solution of a platinum complex of bis((vinyl dimethyl)disiloxane) was stirred at room temperature in a nitrogen atmosphere for 3 days. The resultant reaction mixture was purified by distillation, to obtain 1,14-bis(triethoxysilyl)tetradecane. Its structure was confirmed by NMR.

(Formation of Membrane)

The membrane was prepared in the same manner as in EXAMPLE 1, except that 1,8-bis(triethoxysilyl)octane was replaced by 0.9 g of 1,14-bis(triethoxysilyl)tetradecane and 0.6 g of tungstophosphoric acid was used. The evaluation results are given in Table 1.

EXAMPLE 4

The membrane was prepared in the same manner as in EXAMPLE 1, except that 1,8-bis(triethoxysilyl)octane was replaced by 0.8 g of 1,4-bis(trimethoxysilylethyl)benzene and 0.7 g of tungstophosphoric acid was used. The evaluation results are given in Table 1.

EXAMPLE 5

(Synthesis of bis(triethoxysilylethyl)biphenyl)

Divinyl biphenyl (Nippon Steel Chemical) was hydrosilylated in the same manner as in EXAMPLE 3, to synthesize bis(triethoxysilylethyl)biphenyl. Its structure was confirmed by NMR.

(Formation of Membrane)

The membrane was prepared in the same manner as in EXAMPLE 1, except that 1,8-bis(triethoxysilyl)octane was replaced by 1.0 g of bis(triethoxysilylethyl)biphenyl and 0.5 g of tungstophosphoric acid was used. The evaluation results are given in Table 1.

EXAMPLE 6

The membrane was prepared in the same manner as in EXAMPLE 1, except that 1,8-bis(triethoxysilyl)octane was replaced by 1.0 g of the compound with 10 dimethyl siloxane chains connected in series and trimethoxy silyl groups at both terminals (Shin-Etsu Silicone, X-40-2091), and 0.4 g of tungstophosphoric acid and further 0.2 g of phosphoric acid (Wako Pure Chemical Industries) as the curing catalyst were used. The evaluation results are given in Table 1.

EXAMPLE 7

The membrane was prepared in the same malimer as in EXAMPLE 1, except that tungstophosphoric acid was replaced by molybdophosphoric acid. The evaluation results are given in Table 1.

EXAMPLE 8

The membrane was prepared in the same manner as in EXAMPLE 1, except that tungstophosphoric acid was replaced by tungstosilicic acid. The evaluation results are given in Table 1.

EXAMPLE 9

The membrane was prepared in the same manner as in EXAMPLE 1, except that 0.1 g of n-octyltriethoxysilane (Gelest Inc.) was further incorporated. The resultant membrane was still softer than the one prepared in EXAMPLE 1. The evaluation results are given in Table 1.

EXAMPLE 10

The membrane was prepared in the same manner as in EXAMPLE 1, except that 0.1 g of tetraethoxysilane (Wako Pure Chemical Industries) was further incorporated. The evaluation results are given in Table 1.

EXAMPLE 11

The membrane was prepared in the same manner as in EXAMPLE 1, except that 0.1 g of pure water (Wako Pure Chemical Industries) was further incorporated. The evaluation results are given in Table 1.

EXAMPLE 12

The membrane was prepared in the same manner as in EXAMPLE 1, except that the resultant membrane was further aging-treated at 160° C. for 8 hours in a saturated steam atmosphere in a pressure vessel. The evaluation results are given in Table 1.

COMPARATIVE EXAMPLE 2

An attempt was made to prepare the membrane in the same manner as in EXAMPLE 1, except that 1,8-bis(triethoxysilyl)octane was replaced by tetraethoxysilane. This attempt, however, failed to prepare the self-sustaining membrane which could be measure for its properties, only giving fine fragments. Therefore, the analysis of the membrane for various properties was impossible. The evaluation results are given in Table 1.

COMPARATIVE EXAMPLE 3

The membrane was prepared in the same manner as in EXAMPLE 1, except that tungstophosphoric acid was replaced by 0.5 g of IN hydrochloric acid. The resultant membrane was very fragile, and slightly turbid whitely.

COMPARATIVE EXAMPLE 4

The membrane was prepared in the same manner as in EXAMPLE 1, except that 1,8-bis(triethoxysilyl)octane was replaced by octyltriethoxysilane. The resultant membrane was very soft. The evaluation results are given in Table 1.

COMPARATIVE EXAMPLE 5

Commercial Nafion 117 as the electrolyte membrane for PEFCs was directly used. The evaluation results are given in Table 1.

EXAMPLE 13

The membrane was prepared in the same manner as in EXAMPLE 1, except that the resultant membrane was cured at 40° C. on a hot plate instead of at room temperature (20° C.). The evaluation results are given in Table 1.

The resultant membrane was analyzed by a field emission type electron microscope also in the same manner as in EXAMPLE 1. The microgram is given in FIG. 4.

Figure 4:
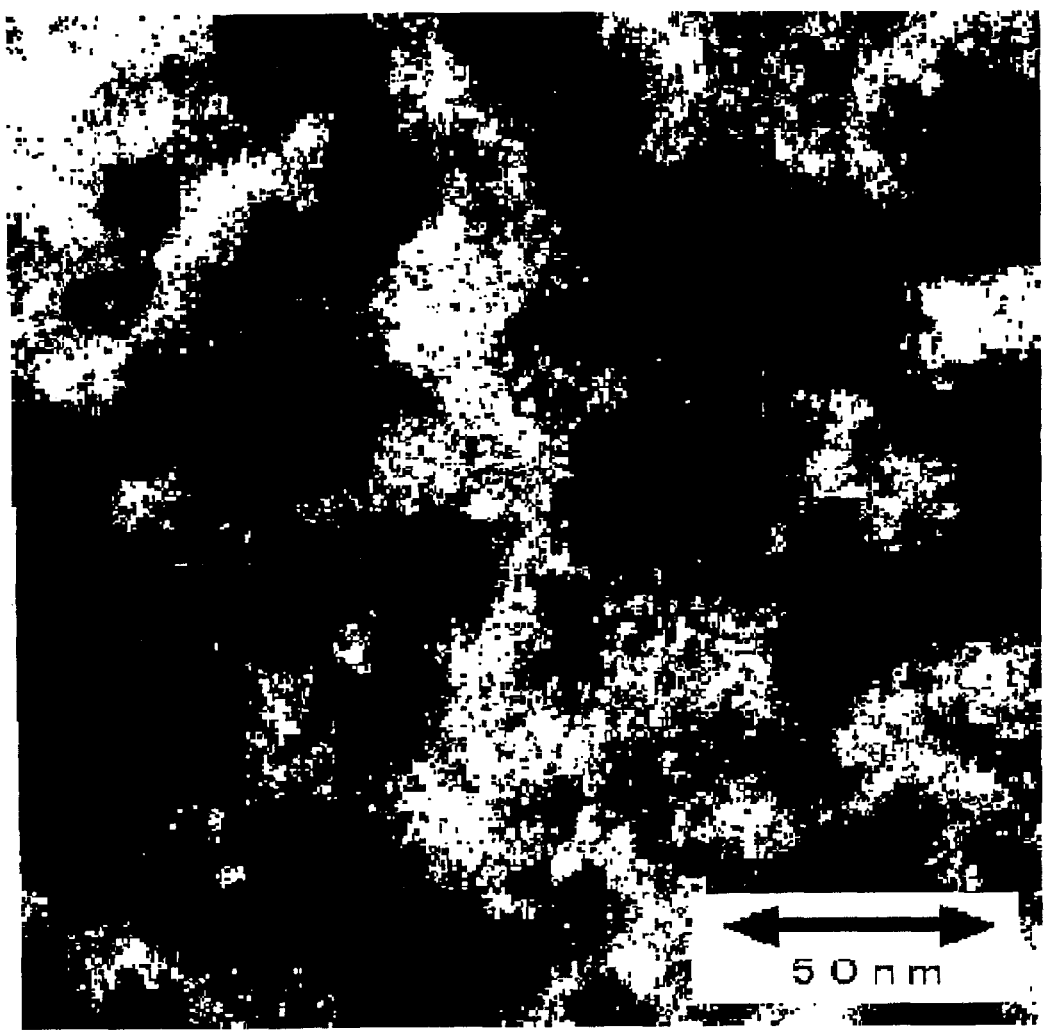
[FIG. 4]

Also in FIG. 4, the white portion represents the phase mainly comprising tungstophophoric acid used as the inorganic acid, and the dark portion corresponds to the carbon-containing phase derived from bis(triethoxysilyl)octane. FIG. 4 clearly indicates, as FIG. 3 for EXAMPLE 1, that the phase-separated structure in which the inorganic acid forms the continuous phase is realized. In the structure prepared in EXAMPLE 13, both inorganic and organic phases are continuous.

EXAMPLE 14

The membrane was prepared in the same manner as in EXAMPLE 1, except that the as received tungstophosphoric acid was replaced by the one dissolved beforehand in a 1 mL of 3.5% ethanol solution of colloidal silica having a particle size of 40 to 50 nm (CHEMAT TECHNOLOGY, INC., RS450) and stirred at room temperature for 12 hours. The resultant membrane was slightly turbid whitely.

EXAMPLE 15

The membrane was prepared in the same manner as in EXAMPLE 1, except that the resultant membrane was immersed in the starting solution for the membrane, similar to that for EXAMPLE 1, for 1 hour, and cured under heating in the same manner as in EXAMPLE 1, after it was lightly wiped by paper. The resultant membrane was transparent, and tougher than that prepared in EXAMPLE 1.

TABLE 1

| | Starting material for the carbon-containing compound (D) | Skeleton section of the carbon-containing compound (B) | $(\delta d^2 + \delta h^2)^{1/2}$ of the skeleton section | Inorganic acid (c) | Quantity of water (E) |
|---|---|---|---|---|---|
| EXAMPLE 1 | Bis(triethoxysilyl) octane | Octane | 0 | Tungstophosphoric acid | Only water of crystallization |
| EXAMPLE 2 | Bis(triethoxysilyl) hexane | Hexane | 0 | Tungstophosphoric acid | Only water of crystallization |
| EXAMPLE 3 | Bis(triethoxysilyl) tetradecane | Tetradecane | 0 | Tungstophosphoric acid | Only water of crystallization |
| EXAMPLE 4 | Bis(triethoxysilylethyl) benzene | Diethylbenzene | Approximately 6 | Tungstophosphoric acid | Only water of crystallization |
| EXAMPLE 5 | Bis(triethoxysilylethyl) biphenyl | Diethylbiphenyl | Approximately 6 | Tungstophosphoric acid | Only water of crystallization |
| EXAMPLE 6 | Bis(triethoxysilylethyl) dimethylsiloxane | Dimethylsiloxane | Approximately 0 | Tungstophosphoric acid | Only water of crystallization |
| EXAMPLE 7 | Bis(triethoxysilyl) octane | Octane | 0 | Molybdophosphoric acid | Only water of crystallization |
| EXAMPLE 8 | Bis(triethoxysilyl) octane | Octane | 0 | Tungstosilicic acid | Only water of crystallization |
| EXAMPLE 9 | Bis(triethoxysilyl) octane | Octane | 0 | Tungstophosphoric acid | Only water of crystallization |
| EXAMPLE 10 | Bis(triethoxysilyl) octane | Octane | 0 | Tungstophosphoric acid | Only water of crystallization |
| EXAMPLE 11 | Bis(triethoxysilyl) octane | Octane | 0 | Tungstophosphoric acid | 0.1 ml incorporated |
| EXAMPLE 12 | Bis(triethoxysilyl) octane | Octane | 0 | Tungstophosphoric acid | Only water of crystallization |
| EXAMPLE 13 | Bis(triethoxysilyl) octane | Octane | 0 | Tungstophosphoric acid | Only water of crystallization |
| EXAMPLE 14 | Bis(triethoxysilyl) octane | Octane | 0 | Tungstophosphoric acid | Only water of crystallization |
| EXAMPLE 15 | Bis(triethoxysilyl) octane | Octane | 0 | Tungstophosphoric acid | Only water of crystallization |
| COMPARATIVE EXAMPLE 1 | Bis(triethoxysilyl) tetramethylene glycol | Polytetramethylene glycol | >7 | Tungstophosphoric acid | Only water of crystallization |
| COMPARATIVE EXAMPLE 2 | (Tetraethoxysilane) | Not included | Not applicable | Tungstophosphoric acid | Only water of crystallization |
| COMPARATIVE EXAMPLE 3 | Bis(triethoxysilyl) octane | Octane | 0 | Hydrochloric acid | water of crystallization and hydrochloric acid |
| COMPARATIVE EXAMPLE 4 | Octyltriethoxysilane | Octane | 0 | Tungstophosphoric acid | Only water of crystallization |
| COMPARATIVE EXAMPLE 5 | Nafion 1 1 7 | | | Sulfonic acid | |

| | Other additives | Evaluation result (1) Bending test | Evaluation (2) Conductivity at 60° C. (s/cm) | Evaluation (2), Conductivity at 140° C. (s/cm) | Evaluation (3) Resistance to heat at 140° C. (s/cm) | Remarks |
|---|---|---|---|---|---|---|
| EXAMPLE 1 | | ○ | $3.4 \times 10^{-2}$ | $1.5 \times 10^{-2}$ | ○ | |
| EXAMPLE 2 | | ○ | $2.2 \times 10^{-2}$ | $1.2 \times 10^{-2}$ | ○ | |
| EXAMPLE 3 | | ○ | $1.0 \times 10^{-2}$ | $8.0 \times 10^{-3}$ | ○ | |
| EXAMPLE 4 | | ○ | $2.5 \times 10^{-2}$ | $2.0 \times 10^{-2}$ | ○ | |
| EXAMPLE 5 | | ○ | $9.7 \times 10^{-3}$ | $7.8 \times 10^{-3}$ | ○ | Impurities remaining in the starting material, High in softness |
| EXAMPLE 6 | | ○ | $8.8 \times 10^{-3}$ | Not measured | ○ | High in softness |
| EXAMPLE 7 | | ○ | $3.0 \times 10^{-2}$ | Not measured | ○ | |
| EXAMPLE 8 | | ○ | $5.0 \times 10^{-3}$ | Not measured | ○ | |
| EXAMPLE 9 | Octyltriethoxy silane | ○ | $1.8 \times 10^{-2}$ | Not measured | ○ | Soft |
| EXAMPLE 10 | Tetraethoxy silane | ○ | $3.0 \times 10^{-2}$ | Not measured | ○ | |
| EXAMPLE 11 | | ○ | $2.8 \times 10^{-2}$ | $1.8 \times 10^{-2}$ | ○ | |
| EXAMPLE 12 | | ○ | $8.7 \times 10^{-3}$ | $8.8 \times 10^{-3}$ | ○ | Aged at 140° C. |
| EXAMPLE 13 | | ○ | $2.3 \times 10^{-3}$ | $1.3 \times 10^{-3}$ | ○ | Initial aging effected at 40° C. |
| EXAMPLE 14 | Fine silica particles | ○ | $3.8 \times 10^{-2}$ | $1.8 \times 10^{-2}$ | ○ | Tungstophosphoric acid supported by silica |
| EXAMPLE 15 | | ○ | $3.7 \times 10^{-2}$ | $2.1 \times 10^{-2}$ | ○ | Recoated, and cured twice |
| COMPARATIVE EXAMPLE 1 | | ○ | $1.1 \times 10^{-4}$ | $1.5 \times 10^{-3}$ | ○ | Tending to decrease at high temperature |
| COMPARATIVE EXAMPLE 2 | | × | Could not be measured | Could not be measured | × | Membrane not formed |

TABLE 1-continued

| | | | | | |
|---|---|---|---|---|---|
| COMPARATIVE EXAMPLE 3 | x | <10⁻⁸ | Could not be measured | x | Fragile, and easily broken |
| COMPARATIVE EXAMPLE 4 | ○ | <10⁻⁸ | Not measured | ○ | Soft |
| COMPARATIVE EXAMPLE 5 | ○ | 1.2 × 10⁻¹ | <10⁻⁶ | x | |

It is apparent from the results shown in Table 1 that almost all of the membranes prepared in EXAMPLES 1 to 12 had a conductivity of $10^{-2}$ S/cm or more, $5\times10^{-3}$ S/cm at the lowest, and exhibited good characteristics at high temperature by selecting a combination of the specific carbon-containing compound (B), three-dimensionally crosslinked silicon-oxygen structure (A) bound thereto, and inorganic acid (C) as the essential components for the proton-conducting membrane.

Such a high conductivity, despite use of a material which inherently shows no contribution to ion conduction (e.g., hydrocarbon or alkyl siloxane), results from the phase-separated structure with the inorganic acid (C) forming the continuous phase (as shown in FIGS. 3 and 4 which present the micrograms), through which the proton is efficiently conducted,.

This phase-separated structure is realized when the SP values related to hydrogen bond and polarity of the 3-component SP value of the carbon-containing compound (B) are sufficiently low to limit solubility of the compound (B) in the inorganic acid (C). The specific effective skeleton structures of the compound (B) include the hydrocarbons described in EXAMPLES 1 to 5 and the alkyl siloxane described in EXAMPLE 13. When the carbon-containing compound (B) is well soluble in the inorganic acid (C), or vice versa (e.g., the case of COMPARATIVE EXAMPLE 1), the membrane can have a high conductivity to some extent, which, however, is around 1/10 to 1/100 of the conductivity attained when the phase-separated structure is realized, as in EXAMPLES 1 to 13.

A heteropoly acid, e.g., tungstophosphoric or molybdophosphoric acid, works an effective agent for proton conduction to realize such a phase-separated structure, and hydrochloric acid (used in COMPARATIVE EXAMPLE 3) cannot secure a sufficiently high conductivity.

The membrane is hard and fragile when it has no carbon-containing compound (B), and the three-dimensionally crosslinked silicon-oxygen structure (A) alone cannot give a serviceable membrane (COMPARATIVE EXAMPLE 2).

Moreover, the membrane should be crosslinked to an adequate extent. For example, a carbon-containing compound with a crosslinkable group only at one terminal cannot give a stable phase-separated structure, and the membrane shows a greatly decreased conductivity (COMPARATIVE EXAMPLE 4).

The fluorine-based membrane which has been used as the representative electrolyte membrane, used in COMPARATIVE EXAMPLE 5, is deteriorated at high temperature, believed to result from desulfonation mainly caused by breakage of the ether bond. It is apparent that such a membrane cannot be used for PEFCs of the next generation serviceable even at high temperature.

By contrast, the proton-conducting membrane of the present invention thermally treated at 160° C., prepared in EXAMPLE 12, shows a conductivity stable from low to high temperature, although losing conductivity to some extent, and is confirmed to be effective as the membrane serviceable at high temperature.

As described above, the self-sustaining membrane which shows a conductivity stable from low to high temperature and can be bent is obtained by selecting a combination of the specific carbon-containing compound (B), three-dimensionally crosslinked silicon-oxygen structure (A) bound thereto, and inorganic acid (C) as the essential components for the proton-conducting membrane.

Industrial Applicability

The present invention provides a proton-conducting membrane showing good characteristics even at high temperature by selecting a combination of the specific carbon-containing compound (B), three-dimensionally crosslinked silicon-oxygen structure (A) bound thereto, and inorganic acid (C) as the essential components to realize sufficient resistance to heat, and also by incorporating an agent for imparting proton conduction and water in the membrane.

Therefore, the proton-conducting membrane can increase operating temperature of PEFCs, which have been attracting attention recently, to 100° C. or higher, and hence can improve power generation efficiency and achieve reduction of catalyst poisoning by CO. At the same time, increased operating temperature allows the PEFCs to go into cogeneration by utilizing heat, leading to drastically improved energy efficiency.

We claim:

1. A proton-conducting membrane, comprising a three-dimensionally crosslinked silicon-oxyaen structure (A), carbon-containing compound (B), and inorganic acid (C), characterized by a phase-separated structure containing a carbon-containing phase containing at least 80% by volume of the carbon-containing compound (B), and inorganic phase containing at least 80% by volume of the inorganic acid (C), the inorganic phase forming the continuous ion-conducting paths, wherein said carbon-containing compound (B) is characterized by the skeleton section substituted with hydrogen at the joint with the three-dimensionally crosslinked silicon-oxygen structure (A), satisfying the following relationship:

$$(\delta p^2 + \delta h^2)^{1/2} < 7 (Mpa)^{1/2}$$

wherein, δp and δh are the polarity and hydrogen bond components of the three-component solubility parameter.

2. The proton-conducting membrane according to claim 1, wherein said phase-separated structure is a sea-island structure with the carbon-containing phase as the island and inorganic phase as the sea.

3. The proton-conducting membrane according to claim 1, wherein said phase-separated structure is composed of a carbon-containing phase and inorganic acid phase both in the form of continuous structure.

4. The proton-conducting membrane according to claim 1, wherein said carbon-containing compound (B) is bound to the three-dimensionally crosslinked silicon-oxygen structure (A) via 2 or more bonds.

5. The proton-conducting membrane according to claim 4, wherein the skeleton section of said carbon-containing compound (B) is a hydrocarbon consisting of carbon and hydrogen.

6. The proton-conducting membrane according to claim 5, wherein the skeleton section of said carbon-containing compound (B) has the structure represented by the following formula (1):

  (1)

wherein, "n" is an integer of 2 to 20.

7. The proton-conducting membrane according to claim 5, wherein the skeleton section of said carbon-containing compound (B) has the structure represented by the following formula (2):

—CH$_2$CH$_2$—(C$_6$H$_4$)$_n$—CH$_2$CH$_2$—  (2)

wherein, "n" is a natural number of 4 or less.

8. The proton-conducting membrane according to claim 4, wherein the skeleton section of said carbon-containing compound (B) has the structure represented by the following formula (3):

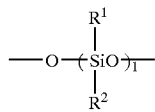  (3)

wherein, R$^1$ and R$^2$ are each a group selected from the group consisting of CH$_3$, C$_2$H$_5$ and C$_6$H$_5$; and "l" is an integer of 2 to 20.

9. The proton-conducting membrane according to claim 1, wherein said inorganic acid (C) is a heteropoly acid.

10. The proton-conducting membrane according to claim 9, wherein said heteropoly acid is used in the form of being supported beforehand by fine particles of a metallic oxide.

11. The proton-conducting membrane according to claim 9, wherein said heteropoly acid is a compound selected from the group consisting of tungstophosphoric, molybdophosphoric and tungstosilicic acid.

12. The proton-conducting membrane of according to claim 1, which contains 10 to 300 parts by weight of the inorganic acid (C) per 100 parts by weight of the three-dimensionally crosslinked silicon-oxygen structure (A) and carbon-containing compound (B) totaled.

13. A method for producing the proton-conducting membrane of any one of claims 1 to 3 comprising a three-dimensionally crosslinked silicon-oxygen structure (A), carbon-containing compound (B) bound to (A) via a covalent bond, and inorganic acid (C), said method comprising steps of preparing a mixture of a carbon-containing compound (D) having one or more hydrolyzable silyl groups and said inorganic acid (C), forming the above mixture into a film, and hydrolyzing/condensing the hydrolyzable silyl group contained in the mixture formed into the film, to form said three-dimensionally crosslinked silicon-oxygen structure (A), wherein the skeleton section of said carbon-containing compound having one or more hydrolyzable silyl groups (D) whose hydrolyzable silyl group(s) are substituted by hydrogen satisfies following relationship:

$(\delta p^2 + \delta h^2)^{1/2} < 7(\text{Mpa})^{1/2}$ wherein, δp and δh are the polarity and hydrogen bond components of the three-component solubility parameter.

14. The method according to claim 13 for producing the proton-conducting membrane, wherein said carbon-containing compound (D) having one or more hydrolyzable silyl groups has 2 hydrolyzable groups.

15. The method according to claim 14 for producing the proton-conducting membrane, wherein said carbon-containing compound (D) having one or more hydrolyzable silyl groups is represented by the following formula (4):

(R$^3$)$_{3-m}$X$_m$Si—R$^4$—SiX$_m$(R$^3$)$_{3-m}$  (4)

wherein, R$^3$ is a group selected from the group consisting of CH$_3$, C$_2$H$_5$ and C$_6$H$_5$; R$^4$ is a hydrocarbon compound consisting of carbon and hydrogen; X is a group selected from the group consisting of Cl, OCH$_3$, OC$_2$H$_5$ and OC$_6$H$_5$; and "m" is a natural number of 3 or less.

16. The method according to claim 15 for producing the proton-conducting membrane, wherein said carbon-containing compound (D) having one or more hydrolyzable silyl groups is represented by the following formula (5):

(R$^3$)$_{3-m}$X$_m$Si—(CH$_2$)$_n$—SiX$_m$(R$^3$)$_{3-m}$  (5)

wherein, R$^3$ is a group selected from the group consisting of CH$_3$, C$_2$H$_5$ and C$_6$H$_5$; X is a group selected from the group consisting of Cl, OCH$_3$, OC$_2$H$_5$ and OC$_6$H$_5$; "m" is a natural number of 3 or less; and "n" is an integer of 2 to 20.

17. The method according to claim 15 for producing the proton-conducting membrane, wherein said carbon-containing compound (D) having one or more hydrolyzable silyl groups is represented by the following formula (6):

(R$^3$)$_{3-m}$X$_m$Si—CH$_2$CH$_2$—(C$_6$H$_4$)$_n$—CH$_2$CH$_2$—SiX$_m$(R$^3$)$_{3-m}$  (6)

wherein, R$^3$ is a group selected from the group consisting of CH$_3$, C$_2$H$_5$ and C$_6$H$_5$; X is a group selected from the group consisting of Cl, OCH$_3$, OC$_2$H$_5$ and OC$_6$H$_5$; "m" is a natural number of 3 or less; and "n" is a natural number of 4 or less.

18. The method according to claim 14 for producing the proton-conducting membrane, wherein said carbon-containing compound (D) having one or more hydrolyzable silyl groups is represented by the following formula (7):

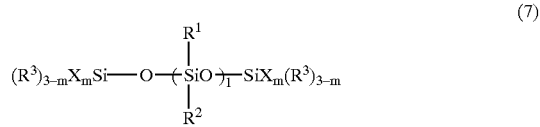  (7)

wherein R$^1$, R$^2$ and R$^3$ are each a group selected from the group consisting of CH$_3$, C$_2$H$_5$ and C$_6$H$_5$; X is a group selectee from the group consisting of Cl, OCH$_3$, OC$_2$H$_5$ and OC$_6$H$_5$; "m" is a natural number of 3 or less; and "l" is an integer of 2 or 20.

19. The method according to claim 13 for producing the proton-conducting membrane, wherein said step of hydrolyzing/condensing the hydrolyzable silyl group to form said three-dimensionally crosslinked silicon-oxygen structure (A) uses water (E) to be contained in said mixture.

20. The method according to claim 13 for producing the proton-conducting membrane, wherein said step of hydrolyzing/condensing the hydrolyzable silyl group to form said three-dimensionally crosslinked silicon-oxygen structure (A) is effected at 5 to 40° C. for 2 hours or more.

21. The method according to claim 13 for producing the proton-conducting membrane, wherein said step of hydrolyzing/condensing the hydrolyzable silyl group to form said three-dimensionally crosslinked silicon-oxygen structure (A) is followed by an aging step effected at 100 to 300° C.

22. The method according to claim 13 for producing the proton-conducting membrane, wherein said step of hydrolyzing/condensing the hydrolyzable silyl group to form said three-dimensionally crosslinked silicon-oxygen structure (A) is followed by a step in which a compound (F) having a hydrolysable silyl group is spread and hydrolyzed/condensed, effected at least once.

23. A fuel cell which incorporates the proton-conducting membrane of any one of claims 1 to 3.

* * * * *